(12) United States Patent
Yang

(10) Patent No.: US 12,244,923 B2
(45) Date of Patent: Mar. 4, 2025

(54) CONTROL METHOD, CAMERA ASSEMBLY, AND MOBILE TERMINAL WITH PANCHROMATIC PIXELS AND MINIMUM REPEATING UNITS

(71) Applicant: GUANGDONG OPPO MOBILE TELECOMMUNICATIONS CORP., LTD., Guangdong (CN)

(72) Inventor: Xin Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 276 days.

(21) Appl. No.: 18/050,339

(22) Filed: Oct. 27, 2022

(65) Prior Publication Data
US 2023/0086743 A1 Mar. 23, 2023

Related U.S. Application Data

(63) Continuation of application No. PCT/CN2021/088401, filed on Apr. 20, 2021.

(30) Foreign Application Priority Data

May 22, 2020 (CN) .......................... 202010440684.2

(51) Int. Cl.
*H04N 23/67* (2023.01)
*H04N 9/01* (2023.01)
(Continued)

(52) U.S. Cl.
CPC ............ *H04N 23/672* (2023.01); *H04N 9/01* (2023.01); *H04N 23/71* (2023.01); *H04N 25/133* (2023.01)

(58) Field of Classification Search
CPC ... H04N 23/672; H04N 25/704; H04N 25/133
See application file for complete search history.

(56) References Cited

U.S. PATENT DOCUMENTS

| 9,148,560 B2 | 9/2015 | Aoki et al. |
| 2009/0021629 A1 | 1/2009 | Yamada |

(Continued)

FOREIGN PATENT DOCUMENTS

| CN | 103460702 | 12/2013 |
| CN | 104205808 | 12/2014 |

(Continued)

OTHER PUBLICATIONS

WIPO, International Search Report and Written Opinion for PCT/CN2021/088401, Jul. 12, 2021.

(Continued)

*Primary Examiner* — Nicholas G Giles
(74) *Attorney, Agent, or Firm* — Hodgson Russ LLP

(57) ABSTRACT

Provided are a control method, a camera assembly, and a mobile terminal. The control method is implemented by an image sensor including a two-dimensional pixel array and a lens array. The two-dimensional pixel array includes multiple color pixels and multiple panchromatic pixels. The color pixels have narrower spectral responses than the panchromatic pixels. The two-dimensional pixel array includes minimum repeating units, each of which includes multiple sub-units, and each of the multiple sub-units includes at least two color pixels of the multiple color pixels and at least two panchromatic pixels of the multiple panchromatic pixels. The lens array includes multiple lenses, each of which covers a corresponding one sub-unit of the sub-units. The control method includes: obtaining phase information of different pixels of the corresponding one sub-unit covered by the lens; and calculating a phase dif- (Continued)

ference according to the phase information of the different pixels, to perform focusing.

11 Claims, 9 Drawing Sheets

(51) Int. Cl.
    *H04N 23/71*     (2023.01)
    *H04N 25/133*     (2023.01)

(56) References Cited

U.S. PATENT DOCUMENTS

| | | | |
|---|---|---|---|
| 2017/0026622 A1* | 1/2017 | Yoon | H01L 27/14621 |
| 2018/0063456 A1 | 3/2018 | Lee | |
| 2019/0068869 A1 | 2/2019 | Kadambala et al. | |

FOREIGN PATENT DOCUMENTS

| | | |
|---|---|---|
| CN | 105611122 | 5/2016 |
| CN | 106506997 | 3/2017 |
| CN | 107040724 | 8/2017 |
| CN | 107146797 | 9/2017 |
| CN | 107395990 | 11/2017 |
| CN | 107786822 | 3/2018 |
| CN | 109981939 | 7/2019 |
| CN | 110808257 | 2/2020 |
| CN | 110996077 | 4/2020 |
| WO | 2014006784 | 1/2014 |

OTHER PUBLICATIONS

CNIPA, First Office Action for CN Application No. 202010440684.2, Apr. 6, 2021.
CNIPA, Notification to Grant Patent Right for Invention for CN Application No. 202010440684.2, Aug. 27, 2021.
EPO, Extended European Search Report for EP Application No. 21808136.2, Aug. 23, 2023.

* cited by examiner

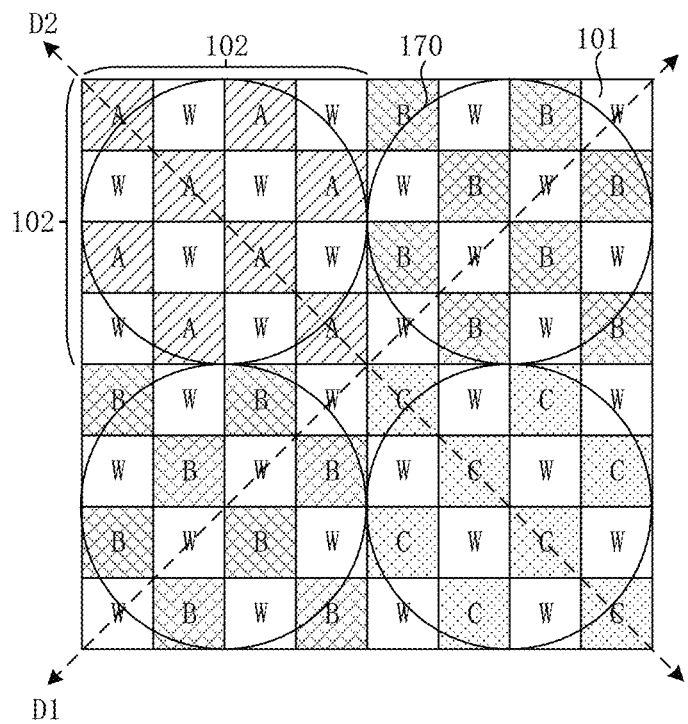
FIG. 11
obtaining phase information of different pixels of the corresponding one sub-unit covered by the lens ⌐ 01
calculating a phase difference according to the phase information of the different pixels, to perform focusing ⌐ 02
FIG. 12
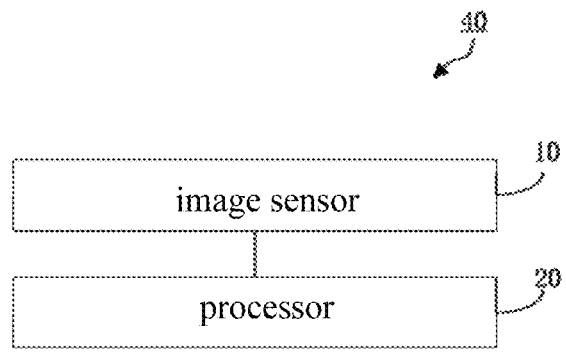
FIG. 13 obtaining the phase information of the at least two color pixels arranged in the second diagonal direction of the corresponding one sub-unit covered by the lens ⸺ 011 calculating the phase difference according to the phase information of the at least two color pixels arranged in the second diagonal direction, to perform focusing ⸺ 021

| obtaining one or more of the phase information of the at least two color pixels arranged in the second diagonal direction of the corresponding one sub-unit covered by the lens, the phase information of the at least two panchromatic pixels arranged in the first diagonal direction of the corresponding one sub-unit covered by the lens, the phase information of pixel pairs arranged in a lengthwise direction of the two-dimensional pixel array in the corresponding one sub-unit covered by the lens, and the phase information of pixel pairs arranged in a widthwise direction of the two-dimensional pixel array in the corresponding one sub-unit covered by the lens | 015 |

| calculating the phase difference according to the one or more of the phase information of the at least two color pixels arranged in the second diagonal direction, the phase information of the at least two panchromatic pixels arranged in the first diagonal direction, the phase information of the pixel pairs arranged in the lengthwise direction of the two-dimensional pixel array, and the phase information of the pixel pairs arranged in the widthwise direction of the two-dimensional pixel array, to perform focusing | 025 |

FIG. 21

CONTROL METHOD, CAMERA ASSEMBLY, AND MOBILE TERMINAL WITH PANCHROMATIC PIXELS AND MINIMUM REPEATING UNITS

CROSS REFERENCE OF RELATED APPLICATION

This application is a continuation of International Application No. PCT/CN2021/088401, filed Apr. 20, 2021, which claims priority to Chinese Patent Application No. 202010440684.2, filed May 22, 2020, the entire disclosures of which are incorporated herein by reference.

TECHNICAL FIELD

The present disclosure relates to the field of focusing technology, and in particularly to a control method, a camera assembly and a mobile terminal.

DESCRIPTION OF RELATED ART

With the development of electronic technology, a terminal with a photographic function has become popular in people's lives. Main focusing manners currently used during a photography process of the terminal such as a mobile phone are contrast detection auto focus and phase detection auto focus (PDAF).

SUMMARY

Embodiments of the present disclosure provide a control method, a camera assembly, and a mobile terminal.

The control method according to the embodiments of the present disclosure is implemented by an image sensor. The image sensor includes a two-dimensional pixel array and a lens array. The two-dimensional pixel array includes multiple color pixels and multiple panchromatic pixels. The multiple color pixels have narrower spectral responses than the multiple panchromatic pixels. The two-dimensional pixel array includes minimum repeating units, in which the multiple panchromatic pixels are arranged in a first diagonal direction and the multiple color pixels are arranged in a second diagonal direction being different from the first diagonal direction. Each of the minimum repeating units includes multiple sub-units. Each of the multiple sub-units includes at least two color pixels and at least two panchromatic pixels. The lens array includes multiple lenses. Each of the multiple lenses covers a corresponding one sub-unit of the multiple sub-units. The control method includes: obtaining phase information of different pixels of the corresponding one sub-unit covered by the lens; and calculating a phase difference according to the phase information of the different pixels, to perform focusing.

The camera assembly according to the embodiments of the present disclosure includes an image sensor and a processor. The image sensor includes a two-dimensional pixel array and a lens array. The two-dimensional pixel array includes multiple color pixels and multiple panchromatic pixels. The multiple color pixels have narrower spectral responses than the multiple panchromatic pixels. The two-dimensional pixel array includes minimum repeating units, in which the multiple panchromatic pixels are arranged in a first diagonal direction and the multiple color pixels are arranged in a second diagonal direction being different from the first diagonal direction. Each of the minimum repeating units includes multiple sub-units. Each of the multiple sub-units includes at least two color pixels and at least two panchromatic pixels. The lens array includes multiple lenses. Each of the multiple lenses covers a corresponding one sub-unit of the multiple sub-units. The processor is configured to: obtain phase information of different pixels of the corresponding one sub-unit covered by the lens; and calculate a phase difference according to the phase information of the different pixels, to perform focusing. The mobile terminal of the embodiments of the present disclosure includes a housing and a camera assembly. The camera assembly is mounted on the housing and includes an image sensor and a processor. The image sensor includes a two-dimensional pixel array and a lens array. The two-dimensional pixel array includes multiple color pixels and multiple panchromatic pixels. The multiple color pixels have narrower spectral responses than the multiple panchromatic pixels. The two-dimensional pixel array includes minimum repeating units, in which the multiple panchromatic pixels are arranged in a first diagonal direction and the multiple color pixels are arranged in a second diagonal direction being different from the first diagonal direction. Each of the minimum repeating units includes multiple sub-units. Each of the multiple sub-units includes at least two color pixels and at least two panchromatic pixels. The lens array includes multiple lenses. Each of the multiple lenses covers a corresponding one sub-unit of the multiple sub-units. The processor is configured to: obtain phase information of different pixels of the corresponding one sub-unit covered by the lens; and calculate a phase difference according to the phase information of the different pixels, to perform focusing.

Additional aspects and benefits of the embodiments of the present disclosure will be partly given in the following description, partly become apparent from the following description, or be learned through the practice of the present disclosure.

BRIEF DESCRIPTION OF DRAWINGS

The above and/or additional aspects and advantages of the present disclosure can become apparent and understandable from the description of embodiments in conjunction with following accompanying drawings, in which:

FIGS. 4 to 11 illustrate schematic views of arrangements of pixels and of minimum repeating units and coverage manners of lenses according to some embodiments of the present disclosure;

FIG. 12 illustrates a schematic flow chart of a control method according to some embodiments of the present disclosure;

FIG. 13 illustrates a schematic view of a camera assembly according to some embodiments of the present disclosure;

FIG. 21 illustrates a schematic flow chart of a control method according to some embodiments of the present disclosure.

DETAILED DESCRIPTION OF EMBODIMENTS

Embodiments of the present disclosure are described in detail below and the embodiments are illustrated in the accompanying drawings, throughout which the same or similar numerals represent the same or similar elements or elements with the same or similar functions. The embodiments described below with reference to the accompanying drawings are exemplary and are intended to explain the present disclosure only, but are not construed as limitations on the present disclosure.

With the development of electronic technology, a terminal with a photographic function has become popular in people's lives. Main focusing methods currently used during a photography process of the terminal such as the mobile phone are contrast detection auto focus and phase detection auto focus (PDAF). The contrast detection auto focus is more accurate, but is slower in speed. The PDAF is faster, but the PDAF currently available on the market is applied on a bayer sensor, and focus performance thereof is not good enough in a lower light environment.

For the above reasons, referring to FIGS. 1, 12, 13 and 22, the embodiments of the present disclosure provide a control method, a camera assembly 40, and a mobile terminal 90.

Figure 1:
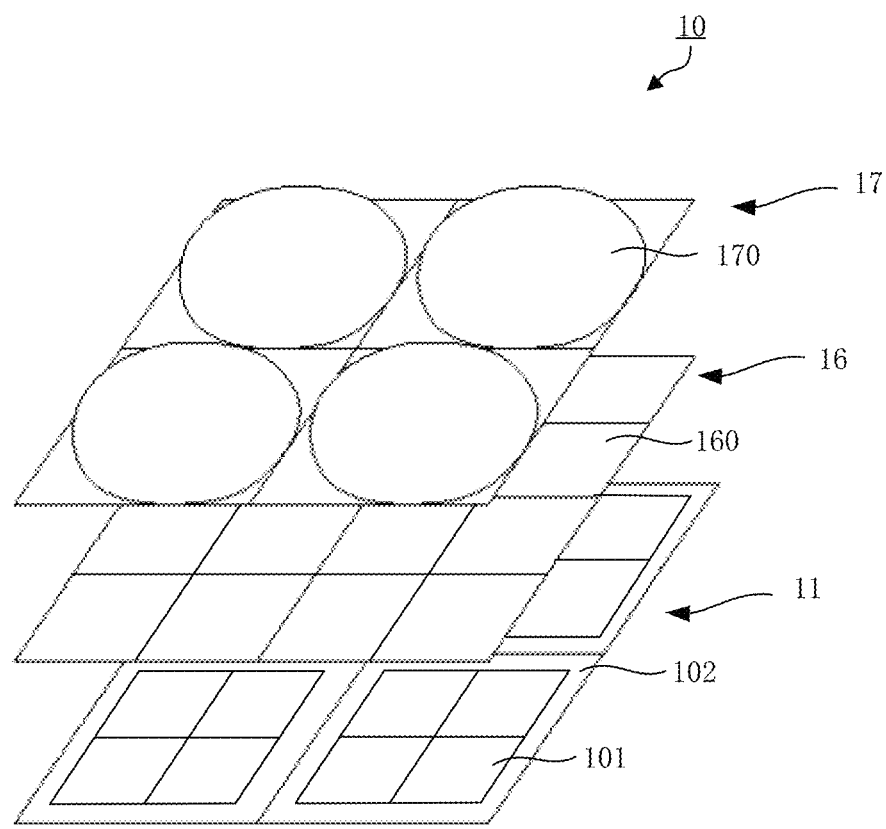
FIG. 1 illustrates a schematic view of an image sensor according to some embodiments of the present disclosure.

Referring to FIG. 1 and FIG. 12, the control method according to the embodiments of the present disclosure may be implemented by an image sensor 10. The image sensor 10 includes a two-dimensional pixel array 11 and a lens array 17. The two-dimensional pixel array 11 includes multiple color pixels and multiple panchromatic pixels. The multiple color pixels have narrower spectral responses than the multiple panchromatic pixels. The two-dimensional pixel array 11 includes minimum repeating units, in which the multiple panchromatic pixels are arranged in a first diagonal direction and the multiple color pixels are arranged in a second diagonal direction being different from the first diagonal direction. Each of the minimum repeating units includes multiple sub-units 102. Each of the multiple sub-units 102 includes at least two color pixels of the multiple color pixels and at least two panchromatic pixels of the multiple panchromatic pixels. The lens array 17 includes multiple lenses 170. Each of the multiple lenses 17 covers a corresponding one sub-unit of the multiple sub-units 102. The control method may include: block 01, obtaining phase information of different pixels 101 of the corresponding one sub-unit 102 covered by the lens 170; and block 02, calculating a phase difference according to the phase information of the different pixels 101, to perform focusing.

In some embodiments, the control method may include: in response to an ambient brightness being smaller than a first predetermined brightness, obtaining phase information of different panchromatic pixels of the corresponding one sub-unit 102 covered by the lens 170, and calculating a phase difference according to the phase information of the different panchromatic pixels, to perform focusing; in response to the ambient brightness being greater than a second predetermined brightness, obtaining phase information of different color pixels of the corresponding one sub-unit 102 covered by the lens 170, and calculating a phase difference according to the phase information of the different color pixels to perform focusing; and in response to the ambient brightness being greater than the first predetermined brightness and smaller than the second predetermined brightness, obtaining the phase information of the different panchromatic pixels and the phase information of the different color pixels of the corresponding one sub-unit 102 covered by the lens 170, and calculating a phase difference according to at least one of the phase information of the different panchromatic pixels and the phase information of the different color pixels, to perform focusing.

Figures 14, 15:
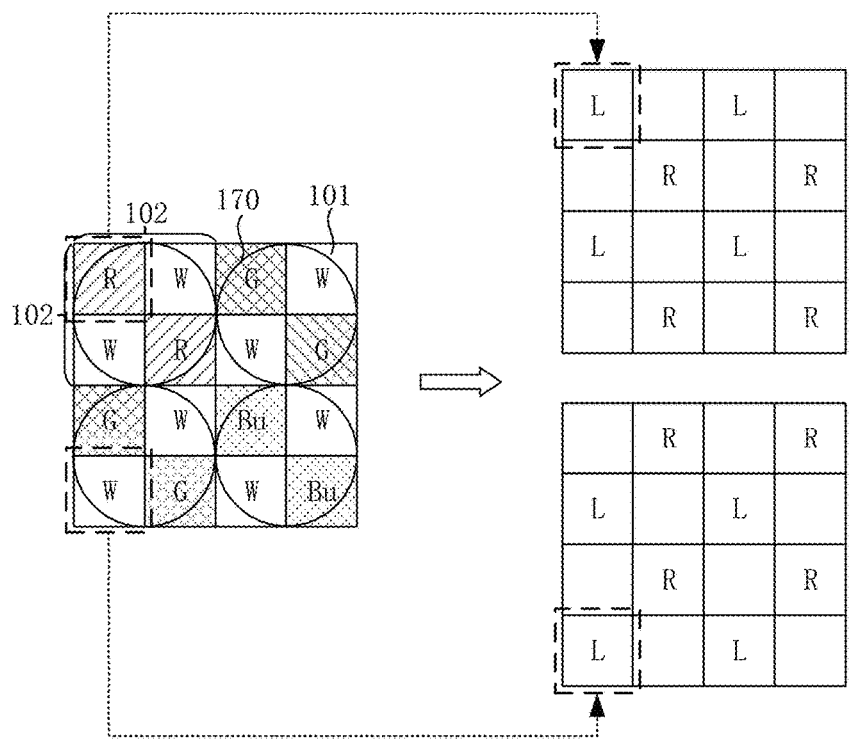
FIG. 14 illustrates a schematic principle view of a control method according to some embodiments of the present disclosure.
FIGS. 15 to 17 illustrate schematic flow charts of control methods according to some embodiments of the present disclosure.

Referring to FIGS. 13 and 15, in some embodiments, the obtaining phase information of different pixels 101 of the corresponding one sub-unit 102 covered by the lens 170 (i.e., the block 01) may include: block 011, obtaining the phase information of the at least two color pixels arranged in the second diagonal direction of the corresponding one sub-unit 102 covered by the lens 170; and the calculating a phase difference according to the phase information of the different pixels 101, to perform focusing (i.e., the block 02) may include: block 021, calculating the phase difference according to the phase information of the at least two color pixels arranged in the second diagonal direction, to perform focusing.

Figure 16:
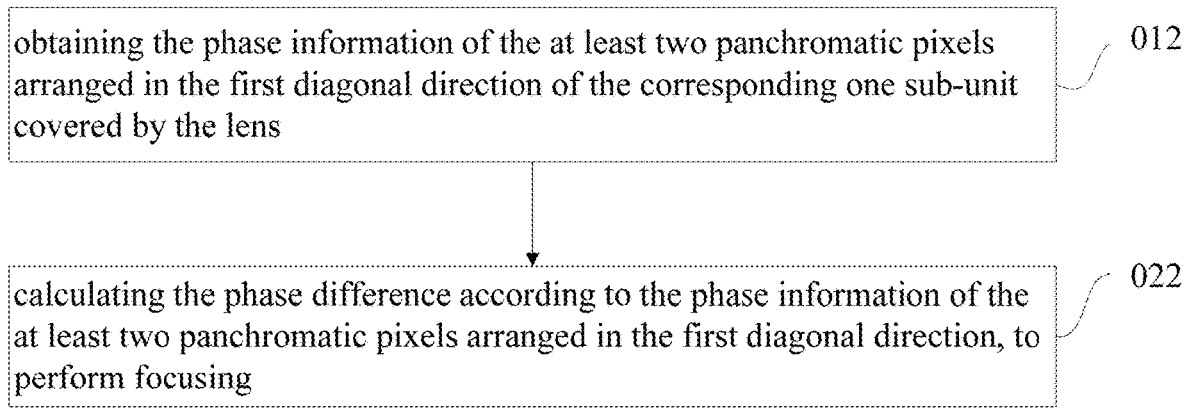

Referring to FIGS. 13 and 16, in some embodiments, the obtaining phase information of different pixels 101 of the corresponding one sub-unit covered by each of the multiple lenses (i.e., the block 01) may include: block 012, obtaining the phase information of the at least two panchromatic pixels arranged in the first diagonal direction of the corresponding one sub-unit 102 covered by the lens 170; and the calculating a phase difference according to the phase information of the different pixels 101, to perform focusing (i.e., the block 02) may include: block 022, calculating the phase difference according to the phase information of the at least two panchromatic pixels arranged in the first diagonal direction, to perform focusing.

Figure 17:
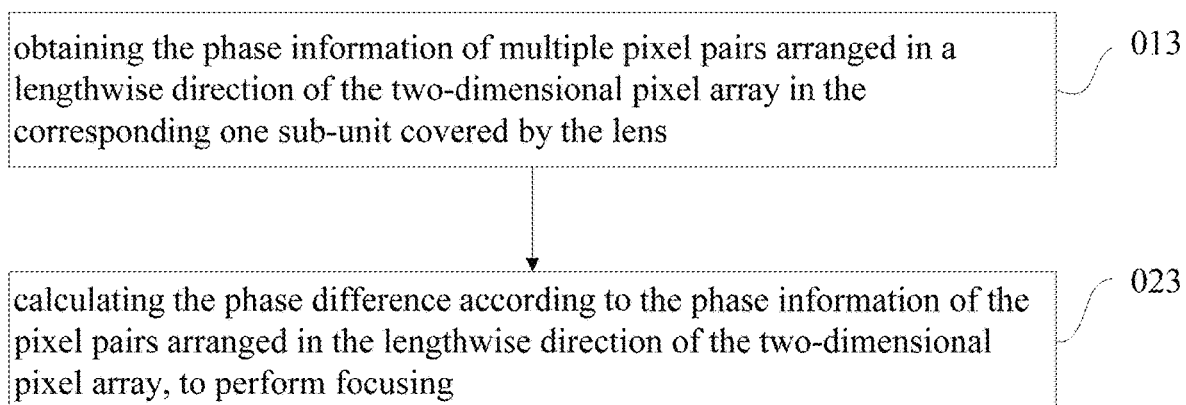

Referring to FIGS. 13 and 17, in some embodiments, the obtaining phase information of different pixels 101 of the corresponding one sub-unit 102 covered by the lens 170 (i.e., the block 01) may include: block 013, obtaining the phase information of multiple pixel pairs arranged in a lengthwise direction of the two-dimensional pixel array 11 in the corresponding one sub-unit 102 covered by the lens 170, each of the multiple pixel pairs including at least one color pixel and at least one panchromatic pixel arranged in a widthwise direction of the two-dimensional pixel array 11 in the corresponding one sub-unit 102 covered by the lens 170; and the calculating a phase difference according to the phase information of the different pixels 101, to perform focusing (i.e., the block 02) may include: block 023, calculating the phase difference according to the phase information of the pixel pairs arranged in the lengthwise direction of the two-dimensional pixel array 11, to perform focusing.

Figure 19:
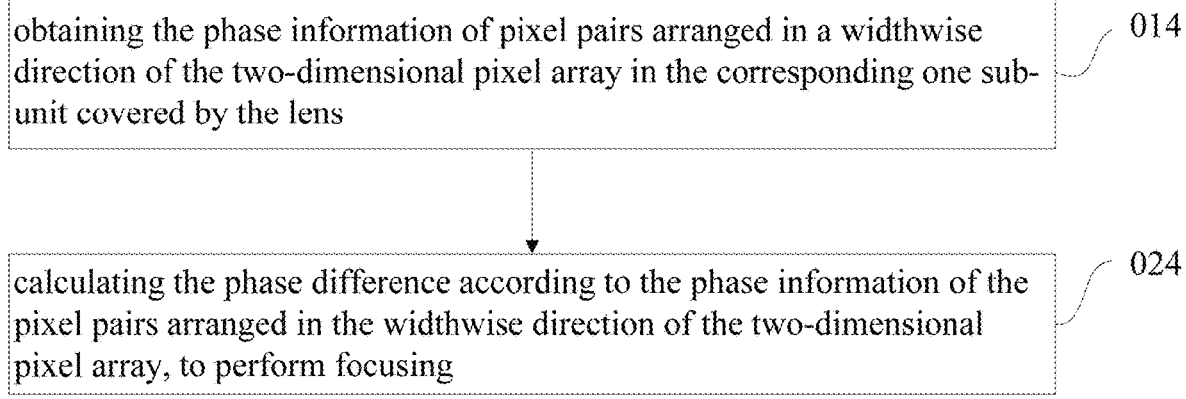
FIG. 19 illustrates a schematic flow chart of a control method according to some embodiments of the present disclosure.

Referring to FIGS. 13 and 19, in some embodiments, the obtaining phase information of different pixels 101 of the corresponding one sub-unit 102 covered by the lens 170 (i.e., the block 01) may include: block 014, obtaining the phase information of pixel pairs arranged in a widthwise direction of the two-dimensional pixel array 11 in the corresponding one sub-unit 102 covered by the lens 170, each of the multiple pixel pairs including at least one color pixels and at least two panchromatic pixels arranged in a lengthwise direction of the two-dimensional pixel array 11 in the corresponding one sub-unit 102 covered by the lens 170; and the calculating a phase difference according to the phase information of the different pixels 101, to perform focusing (i.e., the block 02) may include: block 024, calculating the phase difference according to the phase information of the pixel pairs arranged in the widthwise direction of the two-dimensional pixel array 11, to perform focusing.

Referring to FIGS. 13 and 21, in some embodiments, the obtaining phase information of different pixels 101 of the corresponding one sub-unit 102 covered by the lens 170 (i.e., the block 01) may include: block 015, obtaining one or more of the phase information of the at least two color pixels arranged in the second diagonal direction of the corresponding one sub-unit covered by the lens, the phase information of the at least two panchromatic pixels arranged in the first diagonal direction of the corresponding one sub-unit covered by the lens, the phase information of pixel pairs arranged in a lengthwise direction of the two-dimensional pixel array 11 in the corresponding one sub-unit covered by the lens, and the phase information of pixel pairs arranged in a widthwise direction of the two-dimensional pixel array 11 in the corresponding one sub-unit 102 covered by the lens 170; and the calculating a phase difference according to the phase information of the different pixels 101, to perform focusing (i.e., the block 02) may include: block 025, calculating the phase difference according to the one or more of the phase information of the at least two color pixels arranged in the second diagonal direction, the phase information of the at least two panchromatic pixels arranged in the first diagonal direction, the phase information of pixel pairs arranged in the lengthwise direction of the two-dimensional pixel array 11, and the phase information of pixel pairs arranged in the widthwise direction of the two-dimensional pixel array 11, to perform focusing.

Referring to FIGS. 1 and 13, the camera assembly 40 according to the embodiments of the present disclosure may include an image sensor 10 and a processor 20. The image sensor 10 includes a two-dimensional pixel array 11 and a lens array 17. The two-dimensional pixel array 11 includes multiple color pixels and multiple panchromatic pixels. The multiple color pixels have narrower spectral responses than the multiple panchromatic pixel. The two-dimensional pixel array 11 includes minimum repeating units, in which the multiple panchromatic pixels are arranged in a first diagonal direction and the multiple color pixels are arranged in a second diagonal direction being different from the first diagonal direction. Each of the minimum repeating units includes multiple sub-units 102. Each of the multiple sub-units 102 includes at least two color pixels of the multiple color pixels and at least two panchromatic pixels of the multiple panchromatic pixels. The lens array 17 includes multiple lenses 170. Each of the multiple lenses 170 covers a corresponding one sub-unit of the multiple sub-units 102. The processor 20 is configured to: obtain phase information of different pixels 101 of the corresponding one sub-unit 102 covered by the lens 170; and calculate a phase difference according to the phase information of the different pixels 101, to perform focusing.

In some embodiments, the processor 20 may be further configured to: in response to an ambient brightness being smaller than a first predetermined brightness, phase information of different panchromatic pixels of the corresponding one sub-unit 102 covered by the lens 170, and calculate a phase difference according to the phase information of the different panchromatic pixels, to perform focusing; in response to the ambient brightness being greater than a second predetermined brightness, obtain phase information of different color pixels of the corresponding one sub-unit 102 covered by the lens 170, and calculate a phase difference according to the phase information of the different color pixels to perform focusing; and in response to the ambient brightness being greater than the first predetermined brightness and smaller than the second predetermined brightness, obtain the phase information of the different panchromatic pixels and the phase information of the different color pixels of the corresponding one sub-unit 102 covered by the lens 170, and calculate a phase difference according to at least one of the phase information of the different panchromatic pixels and the phase information of the different color pixels, to perform focusing.

In some embodiments, the processor 20 may be further configured to: obtain the phase information of the at least two color pixels arranged in the second diagonal direction of the corresponding one sub-unit 102 covered by the lens 170; and calculate the phase difference according to the phase information of the at least two color pixels arranged in the second diagonal direction, to perform focusing.

In some embodiments, the processor 20 may be further configured to: obtain the phase information of the at least two panchromatic pixels arranged in the first diagonal direction of the corresponding one sub-unit 102 covered by the lens 170; and calculate the phase difference according to the phase information of the at least two panchromatic pixels arranged in the first diagonal direction, to perform focusing.

In some embodiments, the processor 20 may be further configured to: obtain the phase information of multiple pixel pairs arranged in a lengthwise direction of the two-dimensional pixel array 11 in the corresponding one sub-unit 102 covered by the lens 170, each of the multiple pixel pairs including at least one color pixel and at least one panchromatic pixel arranged in a widthwise direction of the two-dimensional pixel array 11 in the corresponding one sub-unit 102 covered by the lens 170; and calculate the phase difference according to the phase information of the pixel pairs arranged in the lengthwise direction of the two-dimensional pixel array 11, to perform focusing.

In some embodiments, the processor 20 may be further configured to: obtain the phase information of pixel pairs arranged in a widthwise direction of the two-dimensional pixel array 11 in the corresponding one sub-unit 102 covered by the lens 170, each of the multiple pixel pairs including at least one color pixels and at least two panchromatic pixels arranged in a lengthwise direction of the two-dimensional pixel array 11 in the corresponding one sub-unit 102 covered by the lens 170; and calculate the phase difference according to the phase information of the pixel pairs arranged in the widthwise direction of the two-dimensional pixel array 11, to perform focusing.

In some embodiments, the processor 20 may be further configured to: obtain one or more of the phase information of the at least two color pixels arranged in the second diagonal direction of the corresponding one sub-unit covered by the lens, the phase information of the at least two panchromatic pixels arranged in the first diagonal direction of the corresponding one sub-unit covered by the lens, the phase information of pixel pairs arranged in a lengthwise direction of the two-dimensional pixel array 11 in the corresponding one sub-unit covered by the lens, and the phase information of pixel pairs arranged in a widthwise direction of the two-dimensional pixel array 11 in the corresponding one sub-unit 102 covered by the lens 170; and calculate the phase difference according to the one or more of the phase information of the at least two color pixels arranged in the second diagonal direction, the phase information of the at least two panchromatic pixels arranged in the first diagonal direction, the phase information of the pixel pairs arranged in the lengthwise direction of the two-dimensional pixel array 11, and the phase information of the pixel pairs arranged in the widthwise direction of the two-dimensional pixel array 11, to perform focusing.

Figure 22:
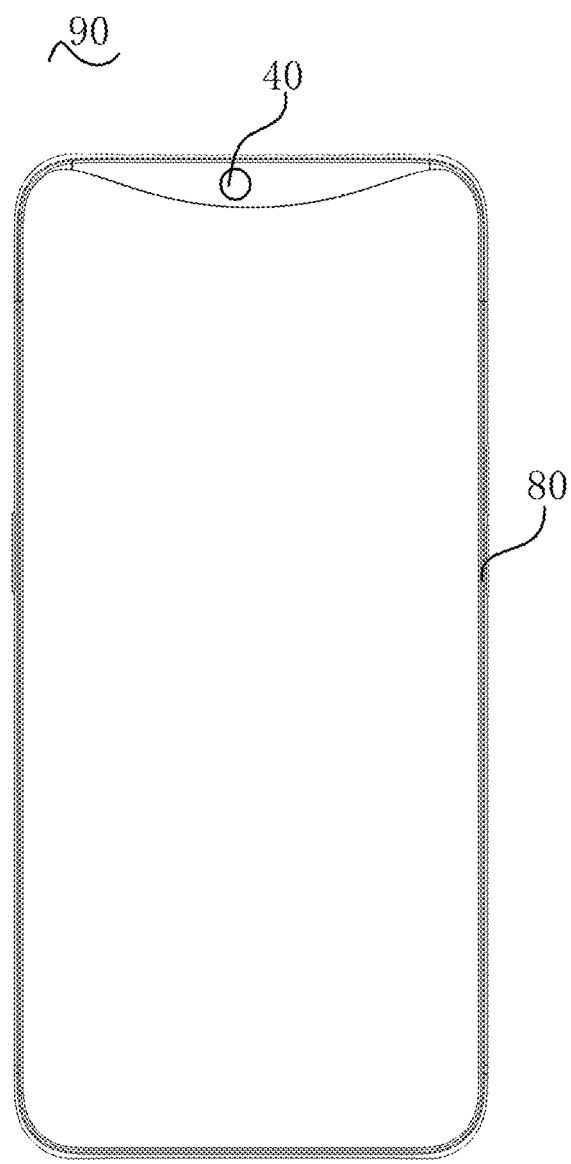
FIG. 22 illustrates a schematic view of a mobile terminal according to some embodiments of the present disclosure.

Referring FIGS. 1, 13 and 22, the mobile terminal 90 according to the embodiments of the present disclosure may include a housing 80 and a camera assembly 40. The camera assembly 40 is mounted on the housing 80 and includes an image sensor 10 and a processor 20. The image sensor 10 includes a two-dimensional pixel array 11 and a lens array 17. The two-dimensional pixel array 11 includes multiple color pixels and multiple panchromatic pixels. The multiple color pixels have narrower spectral responses than the multiple panchromatic pixel. The two-dimensional pixel array 11 includes minimum repeating units, in which the multiple panchromatic pixels are arranged in a first diagonal direction and the multiple color pixels are arranged in a second diagonal direction being different from the first diagonal direction. Each of the minimum repeating units includes multiple sub-units 102. Each of the multiple sub-units 102 includes at least two color pixels of the multiple color pixels and at least two panchromatic pixels of the multiple panchromatic pixels. The lens array 17 includes multiple lenses 170. Each of the multiple lenses 170 covers a corresponding one sub-unit of the multiple sub-units 102. The processor 20 is configured to: obtain phase information of different pixels 101 of the corresponding one sub-unit 102 covered by the lens 170; and calculate a phase difference according to the phase information of the different pixels 101, to perform focusing.

In some embodiments, the processor 20 may be further configured to: in response to an ambient brightness being smaller than a first predetermined brightness, phase information of different panchromatic pixels of the corresponding one sub-unit 102 covered by the lens 170, and calculate a phase difference according to the phase information of the different panchromatic pixels, to perform focusing; in response to the ambient brightness being greater than a second predetermined brightness, obtain phase information of different color pixels of the corresponding one sub-unit 102 covered by the lens 170, and calculate a phase difference according to the phase information of the different color pixels to perform focusing; and in response to the ambient brightness being greater than the first predetermined brightness and smaller than the second predetermined brightness, obtain the phase information of the different panchromatic pixels and the phase information of the different color pixels of the corresponding one sub-unit 102 covered by the lens 170, and calculate a phase difference according to at least one of the phase information of the different panchromatic pixels and the phase information of the different color pixels, to perform focusing.

In some embodiments, the processor 20 may be further configured to: obtain the phase information of the at least two color pixels arranged in the second diagonal direction of the corresponding one sub-unit 102 covered by the lens 170; and calculate the phase difference according to the phase information of the at least two color pixels arranged in the second diagonal direction, to perform focusing.

In some embodiments, the processor 20 may be further configured to: obtain the phase information of the at least two panchromatic pixels arranged in the first diagonal direction of the corresponding one sub-unit 102 covered by the lens 170; and calculate the phase difference according to the phase information of the at least two panchromatic pixels arranged in the first diagonal direction, to perform focusing.

In some embodiments, the processor 20 may be further configured to: obtain the phase information of multiple pixel pairs arranged in a lengthwise direction of the two-dimensional pixel array 11 in the corresponding one sub-unit 102 covered by the lens 170, each of the multiple pixel pairs including at least one color pixel and at least one panchromatic pixel arranged in a widthwise direction of the two-dimensional pixel array 11 in the corresponding one sub-unit 102 covered by the lens 170; and calculate the phase difference according to the phase information of the pixel pairs arranged in the lengthwise direction of the two-dimensional pixel array 11, to perform focusing.

In some embodiments, the processor 20 may be further configured to: obtain the phase information of pixel pairs arranged in a widthwise direction of the two-dimensional pixel array 11 in the corresponding one sub-unit 102 covered by the lens 170, each of the multiple pixel pairs including at least one color pixels and at least two panchromatic pixels arranged in a lengthwise direction of the two-dimensional pixel array 11 in the corresponding one sub-unit 102 covered by the lens 170; and calculate the phase difference according to the phase information of the pixel pairs arranged in the widthwise direction of the two-dimensional pixel array 11, to perform focusing.

In some embodiments, the processor 20 may be further configured to: obtain one or more of the phase information of the at least two color pixels arranged in the second diagonal direction of the corresponding one sub-unit covered by the lens, the phase information of the at least two panchromatic pixels arranged in the first diagonal direction of the corresponding one sub-unit covered by the lens, the phase information of pixel pairs arranged in a lengthwise direction of the two-dimensional pixel array 11 in the corresponding one sub-unit covered by the lens, and the phase information of pixel pairs arranged in a widthwise direction of the two-dimensional pixel array 11 in the corresponding one sub-unit 102 covered by the lens 170; and calculate the phase difference according to the one or more of the phase information of the at least two color pixels arranged in the second diagonal direction, the phase information of the at least two panchromatic pixels arranged in the first diagonal direction, the phase information of the pixel pairs arranged in the lengthwise direction of the two-dimensional pixel array 11, and the phase information of the pixel pairs arranged in the widthwise direction of the two-dimensional pixel array 11, to perform focusing.

For the control method, the camera assembly 40, and the mobile terminal 90 according to the embodiments of the present disclosure, since the two-dimensional pixel array 11 includes multiple color pixels and multiple panchromatic pixels, a luminous flux is increased, a better signal-to-noise ratio is achieved, and a better focusing performance can be achieved in dark light, compared with conventional color sensors.

A basic structure of the image sensor 10 will be described hereinafter. Referring to FIG. 1, FIG. 1 illustrates a schematic view of the image sensor 10 according to an embodiment of the present disclosure. The image sensor 10 includes a two-dimensional pixel array 11, a filter array 16, and a lens array 17. The lens array 17, the filter array 16, and the two-dimensional pixel array 11 are arranged sequentially in a light receiving direction of the image sensor 10.

The image sensor 10 may adopt a complementary metal oxide semiconductor (CMOS) photosensitive element or a charge-coupled device (CCD) sensor photosensitive element.

The two-dimensional pixel array 11 may include multiple pixels 101 arranged in two-dimensional array. The two-dimensional pixel array 11 may include minimum repeating units, each of the minimum repeating units may include multiple sub-units 102.

The filter array 16 may include multiple filters 160, and each of the multiple filters 160 covers a corresponding one pixel 101 of the multiple pixels 101. A spectral response of each pixel 101 (i.e., a color of light that the pixel 101 is capable of receiving) is determined by a color of a corresponding filter 160 covering the pixel 101.

The lens array 17 may include multiple lenses 170, and each of the multiple lenses 170 covers a corresponding one sub-unit of the multiple sub-units 102.

Figure 2:
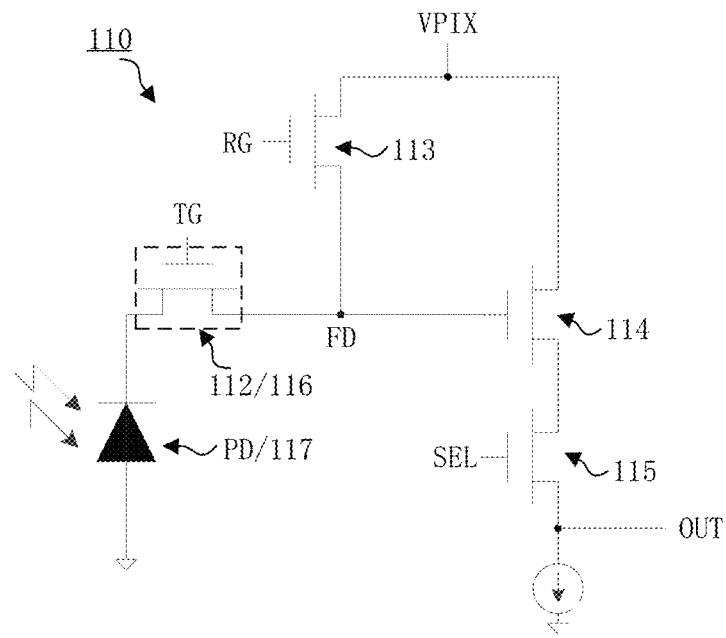
FIG. 2 illustrates a schematic view of a pixel circuit according to some embodiments of the present disclosure.

FIG. 2 illustrates a schematic view of a pixel circuit 110 according to an embodiment of the present disclosure. An operation principle of the pixel circuit 110 will be described below combined with FIGS. 1 and 2.

As shown in FIGS. 1 and 2, the pixel circuit 110 may include a photoelectric conversion element 117 (for example, a photodiode PD), an exposure control circuit 116 (for example, a transfer transistor 112), a reset circuit (for example, a reset transistor 113), an amplifying circuit (for example, an amplifying transistor 114), and a selecting circuit (for example, a selecting transistor 115). In an embodiment of the present disclosure, the transfer transistor 112, the reset transistor 113, the amplifying transistor 114 and the selecting transistor 115 are each, for example, a Metal-Oxide-Semiconductor Field-Effect transistor, but are not limited thereto.

For example, referring to FIGS. 1 and 2, a gate electrode TG of the transfer transistor 112 is connected to a vertical drive unit of the image sensor 10 (not shown) through an exposure control line (not shown); a gate electrode RG of the reset transistor 113 is connected to the vertical drive unit through a reset control line (not shown); and a gate electrode SEL of the selecting transistor 115 is connected to the vertical drive unit through a selecting line (not shown). The exposure control circuit 116 (for example, the transfer transistor 112) of each pixel circuit 110 is electrically connected to the photoelectric conversion element 117 and configured to transfer an electrical potential accumulated by the photoelectric conversion element 117 after illumination. For example, the photoelectric conversion element 117 may include a photodiode PD, and an anode of the photodiode PD is connected, for example, to ground. The photodiode PD converts the received light into an electric charge. A cathode of the photodiode PD is connected to a floating diffusion unit FD through the exposure control circuit 116 (for example, the transfer transistor 112). The floating diffusion unit FD is connected to a gate electrode of the amplifying transistor 114 and a source electrode of the reset transistor 113.

For example, the exposure control circuit 116 may be the transfer transistor 112, and a control terminal TG of the exposure control circuit 116 is the gate electrode of the transfer transistor 112. The transfer transistor 112 is turned on, when a pulse of an effective level (for example, a level VPIX) is transmitted through the exposure control line to the gate electrode of the transfer transistor 112. The transfer transistor 112 transfers the electric charge converted by the photodiode PD to the floating diffusion unit FD.

For example, a drain electrode of the reset transistor 113 is connected to a pixel power supply VPIX. The source electrode of the reset transistor 113 is connected to the floating diffusion unit FD. Before the electric charge is transferred from the photodiode PD to the floating diffusion unit FD, a pulse of an effective reset level is transferred to the gate electrode of the reset transistor 113 through a reset line, and the reset transistor 113 is turned on. The reset transistor 113 resets the floating diffusion unit FD to the pixel power supply VPIX.

For example, the gate electrode of the amplifying transistor 114 is connected to the floating diffusion unit FD. A drain electrode of the amplifying transistor 114 is connected to the pixel power supply VPIX. After the floating diffusion unit FD is reset by the reset transistor 113, the amplifying transistor 114 outputs a reset level through an output terminal OUT via the selecting transistor 115. After the electric charge of the photodiode PD is transferred by the transfer transistor 112, the amplifying transistor 114 outputs a signal level through the selecting transistor 115 via the output terminal OUT.

For example, a drain electrode of the selecting transistor 115 is connected to a source electrode of the amplifying transistor 114. A source electrode of the selecting transistor 115 is connected to a column processing unit in the image sensor 10 (not shown) through the output OUT. The selecting transistor 115 is turned on, when a pulse of an effective level is transmitted to a gate electrode of the selecting transistor 115 through a selection line. A signal output from amplifying transistor 114 is transmitted to the column processing unit through the selecting transistor 115.

It should be noted that a pixel structure of the pixel circuit 110 according to the embodiments of the present disclosure is not limited to the structure shown in FIG. 2. For example, the pixel circuit 110 may have a triode transistor pixel structure, in which functions of the amplifying transistor 114 and the selecting transistor 115 are performed by a single transistor. For example, the exposure control circuit 116 is also not limited to the single transfer transistor 112, and other electronic device or structure having a control terminal for controlling a conduction function can be used as the exposure control circuit in the embodiments of the present disclosure. Further, an implementation of the single transfer transistor 112 is simple, low cost, and easy to control.

For the image sensor including pixels of multiple colors, the pixels of different colors receive different exposure amounts per unit time. After some of the multiple colors are saturated, other some colors of the multiple colors have not yet been exposed to a desired state. For example, when 60-90% of a saturated exposure is exposed, a relatively good signal-to-noise ratio and an good accuracy can be achieved, but the embodiments of the present disclosure are not limited thereto.

Figure 3:
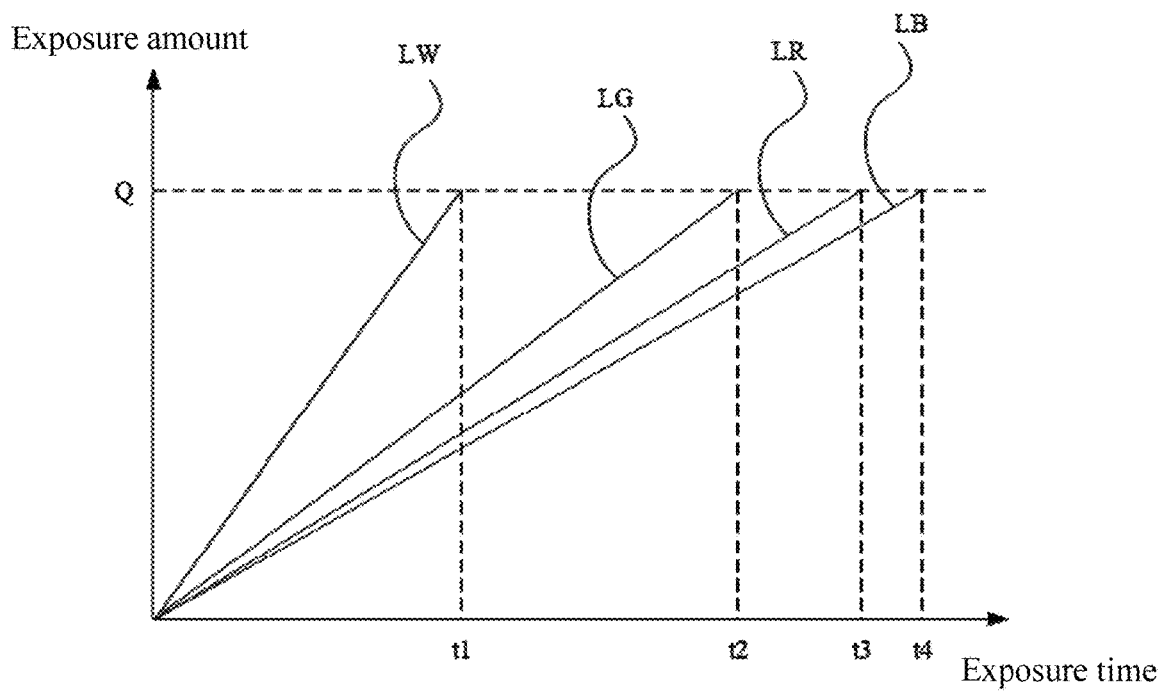
FIG. 3 illustrates a schematic view of exposure saturation time of different color channels.

An example of RGBW (red, green, blue, panchromatic) is illustrated in FIG. 3. Referring to FIG. 3, a horizontal axis represents an exposure time and a vertical axis represents an exposure amount, Q represents a saturated exposure amount, LW represents an exposure curve of a panchromatic pixel W, LG represents an exposure curve of a green pixel G, LR represents an exposure curve of a red pixel R, and LB represents an exposure curve of a blue pixel.

As can be seen from FIG. 3, a slope of the exposure curve LW of the panchromatic pixel W is the greatest, which means that the panchromatic pixel W obtains more exposure amount per unit time and reaches saturation at time t1. A slope of the exposure curve LG of the green pixel G is the second highest, and the green pixel G reaches saturation at time t2. A slope of the exposure curve LR of the red pixel R is again the third highest, and the red pixel R reaches saturation at time t3. A slope of the exposure curve LB for the blue pixel B is the smallest, and the blue pixel B reaches saturation at time t4. As can be seen from FIG. 3, the exposure amount per unit time received by the panchromatic pixel W is greater than the exposure amount per unit time received by each of the color pixels, i.e., a sensitivity of the panchromatic pixel W is higher than that of each of the color pixels.

If an image sensor including only color pixels is used for phase detection auto focus, then in an environment of a high brightness, R, G and B color pixels can receive more light and can output pixel information with a higher signal-to-noise ratio, so an accuracy of the phase detection auto focus is higher. However, in an environment of a low brightness, the R, G and B pixels can receive less light and output pixel information with a lower signal-to-noise ratio, so the accuracy of the phase detection auto focus is also lower.

Based on the above reasons, the image sensor 10 according to the embodiments of the present disclose is designed to have both panchromatic pixels and color pixels in the two-dimensional pixel array 11, therefore, a luminous flux is increased, a better signal-to-noise ratio is achieved, and a better focusing performance can be achieved in dark light, compared with conventional color sensors. In this way, the image sensor 10 according to the embodiments of the present disclosure can achieve accurate focusing in scenarios with different ambient brightness, thereby enhancing a scene adaptability of the image sensor 10.

It should be noted that a spectral response of each pixel 101 (i.e., a color of light that the pixel 101 is capable of receiving) is determined by a color of the filter 160 corresponding to the pixel 101. The color pixels and the panchromatic pixels throughout the present disclosure refer to pixels 101 that are capable of responding to light of same colors as the colors of the corresponding filters 160.

FIGS. 4 to 11 illustrate examples of arrangements of pixels 101 of multipleimage sensors 10 (shown in FIG. 1). Referring to FIGS. 4 to 11, multiple pixels 101 of the two-dimensional pixel array 11 may include both panchromatic pixels W and color pixels (e.g., a first color pixels A, a second color pixels B, and a third color pixels C), where the color pixels and the panchromatic pixels are distinguished by a band of light that can pass through the filters 160 (shown in FIG. 1) thereon, the color pixels have a narrower spectral response than the panchromatic pixels, the spectral response of the color pixels being, for example, a part of the spectral response of the panchromatic pixels W. The two-dimensional pixel array 11 includes minimum repeating units (FIGS. 4 to 11 show examples of the minimum repeating units of the variety of image sensors 10), and the minimum repeating units are replicated and arranged in rows and columns. Each of the minimum repeating units includes sub-units 102, and each of the sub-units 102 includes at least two color pixels and at least two panchromatic pixels. For example, each of the minimum repeating units includes four sub-units 102, where one sub-unit 102 of the four sub-units 102 includes single-color pixels A (i.e., the first color pixels A) and panchromatic pixels W, two sub-units 102 of the four sub-units 102 each include single-color pixels B (i.e., the second color pixels B) and panchromatic pixels W, and the remaining sub-unit 102 of the four sub-units 102 includes single-color pixels C (i.e., the third color pixel C) and panchromatic pixels W.

For example, the minimum repeating unit may have an equal number of pixels 101 in both the row and the column. For example, the minimum repeating unit includes, but is not limited to, a minimum repeating unit of 4 rows and 4 columns, 6 rows and 6 columns, 8 rows and 8 columns, or 10 rows and 10 columns. For example, the sub-unit 102 have an equal number of pixels 101 in both rows and columns. For example, the sub-unit 102 include, but are not limited to, a sub-unit 102 of 2 rows and 2 columns, 3 rows and 3 columns, 4 rows and 4 columns, or 5 rows and 5 columns. This arrangement facilitates to equalize resolutions in a row direction and a column direction of an image and equalize a color representation, to thereby improve a display effect.

In an example, in the minimum repeating unit, the panchromatic pixels W are arranged in a first diagonal direction D1, and the color pixels are arranged in a second diagonal direction D2, with the first diagonal direction D1 being different from the second diagonal direction D2.

Figure 4:
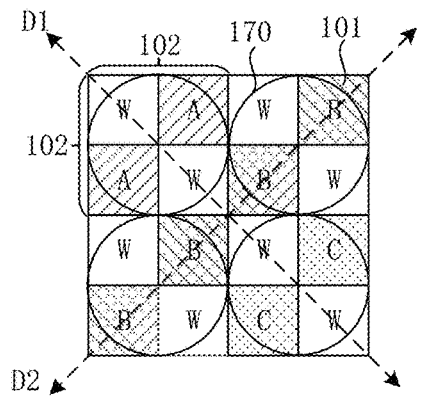

For example, FIG. 4 illustrates a schematic view of an arrangement of pixels 101 of a minimum repeating unit and a coverage manner of lenses 170 according to an embodiment of the present disclosure. The minimum repeating unit has 16 pixels in 4 rows and 4 columns, and each sub-unit 102 has 4 pixels in 2 rows and 2 columns, which are arranged as follows:

| W | A | W | B |
|---|---|---|---|
| A | W | B | W |
| W | B | W | C |
| B | W | C | W | where W represents a panchromatic pixel; A represents a first color pixel of multiple color pixels; B represents a second color pixel of the multiple color pixels; and C represents a third color pixel of the multiple color pixels.

As shown in FIG. 4, the panchromatic pixels W are arranged in the first diagonal direction D1 (i.e., a direction in which an upper left corner and a lower right corner are connected in FIG. 4) and the color pixels are arranged in the second diagonal direction D2 (i.e., a direction in which a lower left corner and an upper right corner are connected in FIG. 4), the first diagonal direction D1 being different from the second diagonal direction D2. For example, the first diagonal direction is perpendicular to the second diagonal direction.

It should be noted, the first diagonal direction D1 and the second diagonal direction D2 are not limited to diagonals, but also include directions parallel to the diagonals. The "direction" herein is not a single orientation, but can be understood as a "straight line" indicating the arrangement, which can be both orientations of the two ends of the straight line.

As shown in FIG. 4, one lens 170 covers four pixels 101.

Figure 5:
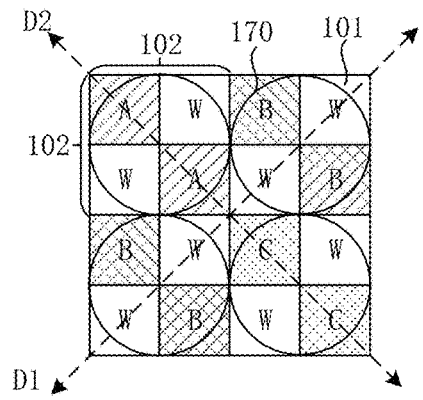

For example, FIG. 5 illustrates a schematic view of an arrangement of pixels 101 of another minimum repeating unit and a coverage manner of lenses 170 according to an embodiment of the present disclosure. The minimum repeating unit has 16 pixels 101 in 4 rows and 4 columns, and the sub-unit 102 has 4 pixels 101 in 2 rows and 2 columns, which are arranged as follows.

| A | W | B | W |
|---|---|---|---|
| W | A | W | B |
| B | W | C | W |
| W | B | W | C | where W represents a panchromatic pixel; A represents a first color pixel of multiple color pixels; B represents a second color pixel of the multiple color pixels; and C represents a third color pixel of the color pixels.

As shown in FIG. 5, the panchromatic pixels W are arranged in the first diagonal direction D1 (i.e., a direction in which an upper right corner and a lower left corner are connected in FIG. 5) and the color pixels are arranged in the second diagonal direction D2 (i.e., a direction in which an upper left corner and a lower right corner are connected in FIG. 5), the first diagonal direction D1 being different from the second diagonal direction D2. For example, the first diagonal direction is perpendicular to the second diagonal direction.

As shown in FIG. 5, one lens 170 covers four pixels 101.

Figure 6:
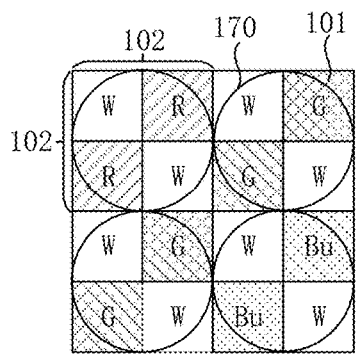
Figure 7:
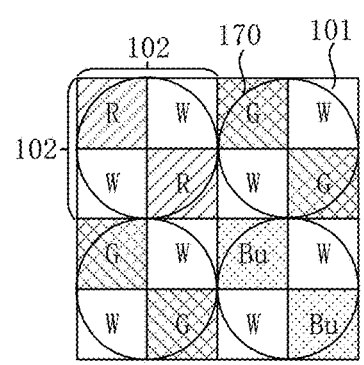

For example, FIG. 6 is a schematic view of an arrangement of pixels 101 of still another minimum repeating unit and a coverage manner of lenses 170 according to an embodiment of the present disclosure. FIG. 7 is a schematic view of an arrangement of pixels 101 of yet another minimum repeating unit and a coverage manner of lenses 170 according to an embodiment of the present disclosure. In the embodiments of FIG. 6 and FIG. 7, arrangements and coverage manners thereof are respectively corresponding to the arrangements and the coverage manners of FIG. 4 and FIG. 5, where the first color pixel A is a red pixel R, the second color pixel B is a green pixel G, and the third color pixel C is a blue pixel Bu.

It should be noted that, in some embodiments, a response band of the panchromatic pixel W is a visible light band (for example, in a range of 400 nm to 760 nm). For example, the panchromatic pixel W is provided with an infrared filter for filtering of infrared light. In some embodiments, the response band of the panchromatic pixel W is the visible light band and a near-infrared band (for example, in a range of 400 nm to 1000 nm), for matching with a response band of the photoelectric conversion element (for example, photodiode PD) of the image sensor 10. In some embodiments, the panchromatic pixel W may be provided without a filter, and the response band of the panchromatic pixel W is determined by the response band of the photodiode, in other words, the response band of the panchromatic pixel W matches with the response band of the photodiode. The embodiments of the present disclosure include, but are not limited to, the above band ranges.

In some embodiments, in the minimum repeating units shown in FIG. 4 and FIG. 5, the first color pixel A may be a red pixel R, the second color pixel B may be a yellow pixel Y, and the third color pixel C may be a blue pixel Bu.

In some embodiments, in the minimum repeating units shown in FIG. 4 and FIG. 5, the first color pixel A may be a magenta pixel M, the second color pixel B may be a cyan pixel Cy, and the third color pixel C may be a yellow pixel Y.

Figure 8:
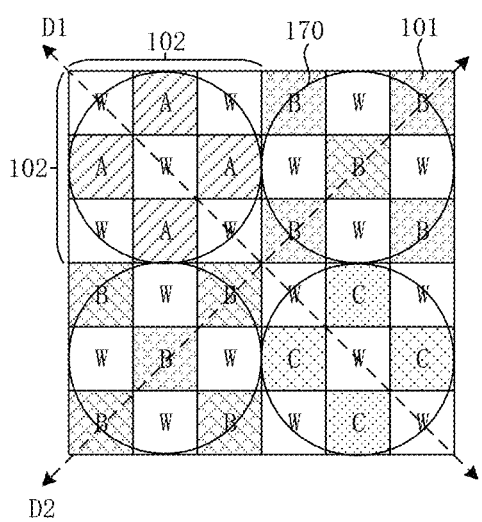

For example, FIG. 8 illustrates a schematic view of an arrangement of pixels 101 of yet another minimum repeating unit and a coverage manner of lenses 170 according to an embodiment of the present disclosure. The minimum repeating unit has 36 pixels 101 in 6 rows and 6 columns, and the sub-unit 102 has 9 pixels 101 in 3 rows and 3 columns, which are arranged as follows.

| W | A | W | B | W | B |
|---|---|---|---|---|---|
| A | W | A | W | B | W |
| W | A | W | B | W | B |
| B | W | B | W | C | W |
| W | B | W | C | W | C |
| B | W | B | W | C | W | where W represents a panchromatic pixel; A represents a first color pixel of multiple color pixels; B represents a second color pixel of the multiple color pixels; and C represents a third color pixel of the multiple color pixels.

As shown in FIG. 8, the panchromatic pixels W are arranged in the first diagonal direction D1 (i.e., a direction in which an upper left corner and a lower right corner are connected in FIG. 8) and the color pixels are arranged in the second diagonal direction D2 (i.e., a direction in which a lower left corner and an upper right corner are connected in FIG. 8), the first diagonal direction D1 being different from the second diagonal direction D2. For example, the first diagonal direction is perpendicular to the second diagonal direction.

As shown in FIG. 8, one lens 170 covers nine pixels 101.

Figure 9:
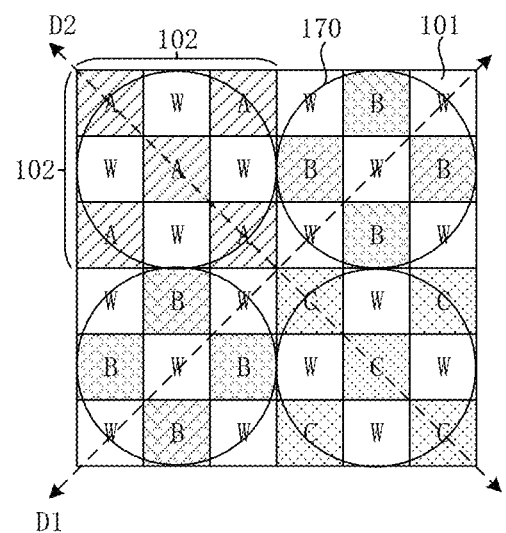

For example, FIG. 9 illustrates a schematic view of an arrangement of pixels 101 of yet another minimum repeating unit and a coverage manner of lens 170 according to an embodiment of the present disclosure. The minimum repeating unit has 36 pixels 101 in 6 rows and 6 columns, and the sub-unit 102 has 9 pixels 101 in 3 rows and 3 columns, which are arranged as follows.

| A | W | A | W | B | W |
|---|---|---|---|---|---|
| W | A | W | B | W | B |
| A | W | A | W | B | W |
| W | B | W | C | W | C |
| B | W | B | W | C | W |
| W | B | W | C | W | C | where W represents a panchromatic pixel; A represents a first color pixel of multiple color pixels; B represents a second color pixel of the multiple color pixels; and C represents a third color pixel of the multiple color pixels.

As shown in FIG. 9, the panchromatic pixels W are arranged in the first diagonal direction D1 (i.e., a direction in which an upper right corner and a lower left corner are connected in FIG. 9) and the color pixels are arranged in the second diagonal direction D2 (i.e., a direction in which an upper left corner and a lower right corner are connected in FIG. 9), the first diagonal direction D1 being different from the second diagonal direction D2. For example, the first diagonal direction is perpendicular to the second diagonal direction.

As shown in FIG. 9, one lens 170 covers nine pixels 101.

Exemplarily, in the minimum repeating units shown in FIG. 8 and FIG. 9, the first color pixel A may be a red pixel R, the second color pixel B may be a green pixel G, and the third color pixel C may be a blue pixel Bu. Alternatively, in the minimum repeating units shown in FIG. 8 and FIG. 9, the first color pixel A may be a red pixel R, the second color pixel B may be a yellow pixel Y, and the third color pixel C may be a blue pixel Bu. Alternatively, in the minimum repeating units shown in FIG. 8 and FIG. 9, the first color pixel A may be a magenta pixel M, the second color pixel B may be a cyan pixel Cy, and the third color pixel C may be a yellow pixel Y.

Figure 10:
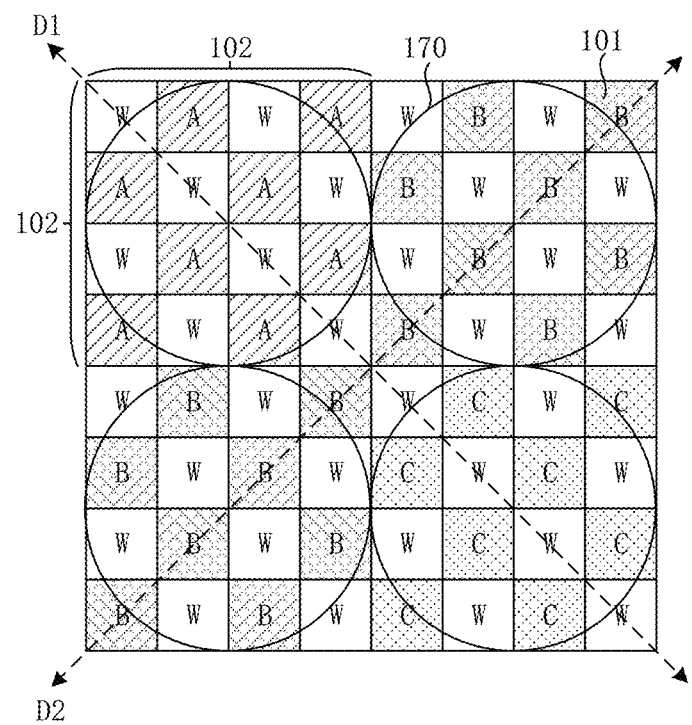

For example, FIG. 10 illustrates a schematic view of an arrangement of pixels 101 of yet another minimum repeating unit and a coverage manner of lens 170 according to an embodiment of the present disclosure. The minimum repeating unit has 64 pixels 101 in 8 rows and 8 columns, and the sub-unit 102 has 16 pixels 101 in 4 rows and 4 columns, which are arranged as follows.

| W | A | W | A | W | B | W | B |
|---|---|---|---|---|---|---|---|
| A | W | A | W | B | W | B | W |
| W | A | W | A | W | B | W | B |
| A | W | A | W | B | W | B | W |
| W | B | W | B | W | C | W | C |
| B | W | B | W | C | W | C | W |
| W | B | W | B | W | C | W | C |
| B | W | B | W | C | W | C | W | where W represents a panchromatic pixel; A represents a first color pixel of multiple color pixels; B represents a second color pixel of the multiple color pixels; and C represents a third color pixel of the multiple color pixels.

As shown in FIG. 10, the panchromatic pixels W are arranged in the first diagonal direction D1 (i.e., a direction in which an upper left corner and a lower right corner are connected in FIG. 10) and the color pixels are arranged in the second diagonal direction D2 (i.e., a direction in which a lower left corner and an upper right corner are connected in FIG. 10), the first diagonal direction D1 being different from the second diagonal direction D2. For example, the first diagonal direction is perpendicular to the second diagonal direction.

As shown in FIG. 10, one lens 170 covers sixteen pixels 101.

For example, FIG. 11 illustrates a schematic view of an arrangement of pixels 101 of yet another minimum repeating unit and a coverage manner of lens 170 according to an embodiment of the present disclosure. The minimum repeating unit has 64 pixels 101 in 8 rows and 8 columns, and the sub-unit 102 has 16 pixels 101 in 4 rows and 4 columns, which are arranged as follows.

| A | W | A | W | B | W | B | W |
|---|---|---|---|---|---|---|---|
| W | A | W | A | W | B | W | B |
| A | W | A | W | B | W | B | W |
| W | A | W | A | W | B | W | B |
| B | W | B | W | C | W | C | W |
| W | B | W | B | W | C | W | C |
| B | W | B | W | C | W | C | W |
| W | B | W | B | W | C | W | C | where W represents a panchromatic pixel; A represents a first color pixel of multiple color pixels; B represents a second color pixel of the multiple color pixels; and C represents a third color pixel of the multiple color pixels.

As shown in FIG. 11, the panchromatic pixels W are arranged in the first diagonal direction D1 (i.e., a direction in which an upper right corner and a lower left corner are connected in FIG. 11) and the color pixels are arranged in the second diagonal direction D2 (i.e., a direction in which an upper left corner and a lower right corner are connected in FIG. 11), the first diagonal direction D1 being different from the second diagonal direction D2. For example, the first diagonal direction is perpendicular to the second diagonal direction.

As shown in FIG. 11, one lens 170 covers sixteen pixels 101.

The panchromatic pixels and the color pixels of any one of the two-dimensional pixel arrays 11 (shown in FIG. 2) of which are shown in FIGS. 4 to 11, may each be controlled by different exposure control lines, thereby enabling independent control of exposure time of the panchromatic pixels and exposure time of the color pixels. Specifically, control terminals of exposure control circuits of at least two panchromatic pixels adjacent in the first diagonal direction are electrically connected to a first exposure control line, and control terminals of exposure control circuits of at least two color pixels adjacent in the second diagonal direction are electrically connected to a second exposure control line. The first exposure control line may transmit a first exposure signal to control first exposure time of the panchromatic pixels, and the second exposure control line may transmit a second exposure signal to control second exposure time of the color pixels.

When the exposure time of the panchromatic pixels and the exposure time of the color pixels are controlled independently, and the first exposure time of the panchromatic pixels may be smaller than the second exposure time of the color pixels. For example, a ratio of the first exposure time to the second exposure time may be one of 1:2, 1:3, or 1:4. For example, in an environment with darker light, where the color pixels are more likely to be underexposed than the panchromatic pixels, the ratio of the first exposure time to the second exposure time may be adjusted to 1:2, 1:3 or 1:4 according to an ambient brightness. Specifically, when an exposure ratio is set to be an integer ratio as described above or close to an integer ratio, it is facilitated for the setting and control of a timing sequence signal.

In some embodiments, a relative relationship between the first exposure time and the second exposure time may be determined according to the ambient brightness. For example, when the ambient brightness is smaller than or equal to a brightness threshold, the panchromatic pixels are exposed with the first exposure time being equal to the second exposure time; and when the ambient brightness is greater than the brightness threshold, the panchromatic pixels are exposed with the first exposure time being smaller than the second exposure time. When the ambient brightness is greater than the brightness threshold, the relative relationship between the first exposure time and the second exposure time may be determined according to a brightness difference between the ambient brightness and the brightness threshold, for example, the greater the brightness difference, the smaller the ratio of the first exposure time to the second exposure time. Exemplarily, the ratio of the first exposure time to the second exposure time is 1:2, when the brightness difference is within a first range [a,b); the ratio of the first exposure time to the second exposure time is 1:3, when the brightness difference is within a second range [b,c), and the ratio of the first exposure time to the second exposure time is 1:4, when the brightness difference is greater than or equal to c.

Referring to FIGS. 1 and 12, the control method according to embodiments of the present disclosure may be implemented by the image sensor 10 according to any one of the embodiments described above. The control method includes: block 01, obtaining phase information of different pixels 101 of the corresponding one sub-unit 102 covered by the lens 170; and block 02, calculating a phase difference according to the phase information of the different pixels 101, to perform focusing.

Referring to FIGS. 1 and 13, the control method of the embodiments of the present disclosure may be implemented by a camera assembly 40 according to embodiments of the present disclosure. The camera assembly 40 may include an image sensor 10 and a processor 20 according to any one of the above embodiments. The processor 20 may be integrated within the image sensor 10, or may be arranged independently of the image sensor 10. Blocks 01 and 02 may be implemented by the processor 20. That is to say, the processor 20 may be configured to: obtain phase information of different pixels 101 of the corresponding one sub-unit 102 covered by the lens 170; and calculate a phase difference according to the phase information of the different pixels 101, to perform focusing.

With respect to the control method and the camera assembly 40 of the embodiments of the present disclosure, the two-dimensional pixel array 11 includes multiple color pixels and multiple panchromatic pixels, a luminous flux is increased, a better signal-to-noise ratio is achieved, and a better focusing performance can be achieved in dark light, compared with conventional color sensors.

In addition, with respect to the control method and camera assembly 40 of the embodiments of the present disclosure, it is not required to make a masking design for the pixels 101 of the image sensor 10, and all of the pixels 101 can be used for imaging without bad/defect pixel compensation, which facilitates a quality of a target image acquired by the camera assembly 40.

In addition, with respect to the control method and camera assembly 40 of the embodiments of the present disclosure, all of the pixels 101 of the sub-units 102 covered by each lens 170 can be used for phase detection auto focus with a higher accuracy.

Specifically, taking FIG. 14 as an example, the minimum repeating unit includes four sub-units 102, from left to right and from top to bottom, a sub-unit U1, a sub-unit U2, a sub-unit U3, and a sub-unit U4. The minimum repeating unit includes 16 pixels 101, from left to right and from top to bottom: a color pixel R11, a panchromatic pixel W12, a color pixel G13, a panchromatic pixel W14, a panchromatic pixel W21, a color pixel R22, a panchromatic pixel W23, a color pixel G24, a color pixel G31, a panchromatic pixel W32, a color pixel B33, a panchromatic pixel W34, a panchromatic pixel W41, a color pixel G42, a panchromatic pixel W43, and a color pixel B44. That is to say, the sub-unit U1 includes the color pixel R11, the panchromatic pixel W12, the panchromatic pixel W21, and the color pixel R22; the sub-unit U2 includes the color pixel G13, the panchromatic pixel W14, the panchromatic pixel W23, and the color pixel G24; the sub-unit U3 includes the color pixel G31, the panchromatic pixel W32, the panchromatic pixel W41, the color pixel G42, and sub-unit U4 includes the color pixel B33, the panchromatic pixel W34, the panchromatic pixel W43, and the color pixel B44.

For the sub-unit U1 covered by the lens 170, the processor 20 obtains phase information of the color pixel R11 and the color pixel R22, and then calculates a phase difference according to the phase information of the color pixel R11 and the color pixel R22, to perform focusing. Alternatively, the processor 20 obtains phase information of the panchromatic pixel W12 and the panchromatic pixel W21, and then calculates a phase difference according to the phase information of the panchromatic pixel W12 and the panchromatic pixel W21, to perform focusing. Alternatively, the processor 20 obtains phase information of the color pixel R11 and the color pixel R22, and the phase information of the panchromatic pixel W12 and the panchromatic pixel W21, and then calculates a phase difference according to the phase information of the color pixel R11 and the color pixel R22 and the phase information of the panchromatic pixel W12 and the panchromatic pixel W21, to perform focusing.

For the sub-unit U2 covered by the lens 170, the processor 20 obtains phase information of the color pixel G13 and the color pixel G24, and then calculates a phase difference according to the phase information of the color pixel G13 and the color pixel G24, to perform focusing. Alternatively, the processor 20 obtains phase information of the panchromatic pixel W14 and the panchromatic pixel W23, and then calculates a phase difference according to the phase information of the panchromatic pixel W14 and the panchromatic pixel W23, to perform focusing. Alternatively, the processor 20 obtains phase information of the color pixel G13 and the color pixel G24, and phase information of the panchromatic pixel W14 and the panchromatic pixel W23, and then calculates a phase difference according to the phase information of the color pixel G13 and the color pixel G24 and the phase information of the panchromatic pixel W14 and the panchromatic pixel W23, to perform focusing.

For the sub-unit U3 covered by the lens 170, the processor 20 obtains phase information of the color pixel G31 and the color pixel G42, and then calculates a phase difference according to the phase information of the color pixel G31 and the color pixel G42, to perform focusing. Alternatively, the processor 20 obtains phase information of the panchromatic pixel W32 and the panchromatic pixel W41, and then calculates a phase difference according to the phase information of the panchromatic pixel W32 and the panchromatic pixel W41, to perform focusing. Alternatively, the processor 20 obtains phase information of the color pixel G31 and the color pixel G42, and phase information of the panchromatic pixel W32 and the panchromatic pixel W41, and then calculates a phase difference according to the phase information of the color pixel G31 and the color pixel G42 and the phase information of the panchromatic pixel W32 and the panchromatic pixel W41, to perform focusing.

For the sub-unit U4 covered by the lens 170, the processor 20 obtains phase information of the color pixel B33 and the color pixel B44, and then calculates a phase difference according to the phase information of the color pixel B33 and the color pixel B44, to perform focusing. Alternatively, the processor 20 obtains phase information of the panchromatic pixel W34 and the panchromatic pixel W43, and then calculates a phase difference according to the phase information of the panchromatic pixel W34 and the panchromatic pixel W43, to perform focusing. Alternatively, the processor 20 obtains phase information of the color pixel B33 and the color pixel B44, and phase information of the panchromatic pixel W34 and the panchromatic pixel W43, and then calculates a phase difference according to the phase information of the color pixel B33 and the color pixel B44 and the phase information of the panchromatic pixel W34 and the panchromatic pixel W43, to perform focusing.

Thus, the processor 20 may obtain the phase information of the different pixels 101 of the sub-unit 102 covered by the lens 170 and calculate the phase difference according to the phase information of the different pixels 101, to perform focusing. It is noted that the processor 20 may obtain the phase information of the different pixels 101 of only one sub-unit 102 and then calculate the phase difference according to the phase information of the different pixels 101, to perform focusing; or the processor may obtain the phase information of the different pixels 101 of the multiple sub-units 102, and then calculate the phase difference according to the phase information of the different pixels 101, to perform focusing.

The processor 20 may be further configured to obtain an ambient brightness. When the ambient brightness is smaller than a first predetermined brightness, the processor 20 obtains phase information of different panchromatic pixels of the corresponding one sub-unit 102 covered by the lens 170, and calculates a phase difference according to the phase information of the different panchromatic pixels, to perform focusing. When the ambient brightness is greater than a second predetermined brightness, the processor 20 obtains phase information of different color pixels of the corresponding one sub-unit 102 covered by the lens 1700, and calculates a phase difference according to the phase information of the different color pixels, to perform focusing. When the ambient brightness is greater than the first predetermined brightness and smaller than the second predetermined brightness, the processor 20 obtains phase information of the different panchromatic pixels and phase information of the different color pixels of the corresponding one sub-unit 102 covered by the lens 170, and calculates a phase difference according to at least one of the phase information of the different panchromatic pixels and the phase information of the different color pixels, to perform focusing. Specifically, the first predetermined brightness is smaller than the second predetermined brightness. The calculating the phase difference according to at least one of the phase information of the different panchromatic pixels and the phase information of the different color pixels, to perform focusing may include: calculating the phase difference only according to the phase information of the different panchromatic pixels, to perform focusing; or calculating the phase difference only according to the phase information of the different color pixels, to perform focusing; or calculating the phase difference according to both the phase information of the different panchromatic pixels and the phase information of the different color pixels, to perform focusing.

With respect to the control method and the camera assembly 40 according to the embodiments of the present disclosure, the image sensor 10 including the panchromatic pixels and the color pixels is adopted to achieve phase detection auto focus, so that the panchromatic pixels with higher sensitivities can be used for phase detection auto focus in an environment with a lower brightness (e.g., with a brightness being smaller than or equal to a first predetermined brightness); the color pixels with lower sensitivities can be used for phase detection auto focus in an environment with a higher brightness (e.g., with a brightness being greater than or equal to a second predetermined brightness); and at least one type of the panchromatic pixels and the color pixels is used for phase detection auto focus in an environment with a moderate brightness (e.g. with a brightness being greater than the first predetermined brightness and smaller than the second predetermined brightness). In this way, a problem of inaccurate focusing due to a low signal-to-noise ratio of information output from the color pixels during using the color pixels for phase detection auto focus in the environment with the low brightness can be avoided, and a problem of inaccurate focusing due to an oversaturation of the panchromatic pixels during using the panchromatic pixels for focusing in the environment with the high brightness can be avoided, therefore, the phase detection auto focus has a higher accuracy in a variety of application scenarios, and has a good scenario adaptability.

Referring to FIGS. 13 and 15, in some embodiments, the obtaining phase information of different pixels 101 of the corresponding one sub-unit 102 covered by the lens 170 (i.e., block 01) may include: block 011, obtaining the phase information of the at least two color pixels arranged in the second diagonal direction of the corresponding one sub-unit 102 covered by the lens 170; and the calculating a phase difference according to the phase information of the different pixels 101, to perform focusing (i.e., the block 02) may include: block 021, calculating the phase difference according to the phase information of the at least two color pixels arranged in the second diagonal direction, to perform focusing.

Referring to FIG. 13, in some embodiments, blocks 011 and 021 may be implemented by the processor 20. That is, processor 20 may be configured to: obtain the phase information of color pixels arranged in the second diagonal direction of the sub-unit 102 covered by the lens 170; and calculate the phase difference according to the phase information of the color pixels arranged in the second diagonal direction, to perform focusing.

Specifically, using FIG. 14 as an example again, for the sub-unit U1 covered by the lens 170, the processor 20 obtains phase information of the color pixel R11 and the color pixel R22 arranged in the second diagonal direction, where the phase information of the color pixel R11 is L11 and the phase information of the color pixel R22 is R22, and then the processor 20 calculates a phase difference according to the phase information L11 of the color pixel R11 and the phase information R22 of the color pixel R22, to perform focusing. For the sub-unit U2 covered by the lens 170, the processor 20 obtains phase information of the color pixel G13 and the color pixel G24 arranged in the second diagonal direction, where the phase information of the color pixel G13 is L13 and the phase information of the color pixel G24 is R24, and then the processor 20 calculates a phase difference according to the phase information L13 of the color pixel G13 and the phase information R24 of the color pixel G24, to perform focusing. For the sub-unit U3 covered by the lens 170, the processor 20 obtains phase information of the color pixel G31 and the color pixel G42 arranged in the second diagonal direction, where the phase information of the color pixel G31 is L31 and the phase information of the color pixel G42 is R42, and then the processor 20 calculates a phase difference according to the phase information L31 of the color pixel G31 and the phase information R42 of the color pixel G42, to perform focusing. For the sub-unit U4 covered by the lens 170, the processor 20 obtains phase information of the color pixel B33 and the color pixel B44 arranged in the second diagonal direction, where the phase information of the color pixel B33 is L33 and the phase information of the color pixel B44 is R44, and then the processor 20 calculates a phase difference according to the phase information L33 of the color pixel B33 and the phase information R44 of the color pixel B44, to perform focusing.

In the embodiments of the present disclosure, the processor 20 calculates the phase difference according to the phase information of the color pixels arranged in the second diagonal direction, to perform focusing, and more specifically, the processor 20 may calculate the phase difference according to the phase information of the color pixels of the same color (for example, a first single color pixel R, or a second single color pixel G, or a third single color pixel B) arranged in the second diagonal direction, to perform focusing. The control method and the camera assembly 40 according to the embodiments of the present disclosure is more suitable for application in the above scenario where the ambient brightness is greater than the second predetermined brightness.

Further, when the processor 20 obtains phase information of the color pixels arranged in the second diagonal direction of each of the sub-units 102, the processor 20 may form a first color phase curve according to first phase information of the phase information of the color pixels arranged in the second diagonal direction of each of the sub-units 102, and form a second color phase curve according to second phase information of the phase information of the color pixels arranged in the second diagonal direction of each of the sub-units 102, and then calculate phase difference according to the first color phase curve and the second color phase curve, to perform focusing. Specifically, the first phase information may be the aforementioned "L" phase information and the second phase information may be the aforementioned "R" phase information. For example, the processor 20 forms the first color phase curve according to the phase information L11, L13, L31, and L33, and forms the second color phase curve according to the phase information R22, R24, R42, and R44, and then calculates the phase difference according to positions of peaks of the first color phase curve and the second color phase curve, to perform focusing.

Referring to FIGS. 13 and 16, in some embodiments, obtaining phase information of different pixels 101 of the corresponding one sub-unit covered by each of the multiple lenses (i.e., block 01) may include: block 012, obtaining the phase information of the at least two panchromatic pixels arranged in the first diagonal direction of the corresponding one sub-unit 102 covered by the lens 170; and the calculating a phase difference according to the phase information of the different pixels 101, to perform focusing (i.e., the block 02) may include: block 022, calculating the phase difference according to the phase information of the at least two panchromatic pixels arranged in the first diagonal direction, to perform focusing.

Referring to FIG. 13, in some embodiments, blocks 021 and 022 may be implemented by the processor 20. That is, processor 20 may be configured to: obtain the phase information of the at least two panchromatic pixels arranged in the first diagonal direction of the corresponding one sub-unit 102 covered by the lens 170; and calculate the phase difference according to the phase information of the at least two panchromatic pixels arranged in the first diagonal direction, to perform focusing.

Specifically, using FIG. 14 as an example again, for the sub-unit U1 covered by the lens 170, the processor 20 obtains phase information of the panchromatic pixel W12 and the panchromatic pixel W21 arranged in the first diagonal direction, where the phase information of the panchromatic pixel W12 is R12 and the phase information of the panchromatic pixel W21 is L21, and then the processor 20 calculates a phase difference according to the phase information R12 of the panchromatic pixel W12 and the phase information L21 of the panchromatic pixel W21, to perform focusing. For the sub-unit U2 covered by the lens 170, the processor 20 obtains phase information of the panchromatic pixel W14 and the panchromatic pixel W23 arranged in the first diagonal direction, where the phase information of the panchromatic pixel W14 is R14 and the phase information of the panchromatic pixel W23 is L23, and then the processor 20 calculates a phase difference according to the phase information R14 of the panchromatic pixel W14 and the phase information L23 of the panchromatic pixel W23, to perform focusing. For the sub-unit U3 covered by the lens 170, the processor 20 obtains phase information of the panchromatic pixel W32 and the panchromatic pixel W41 arranged in the first diagonal direction, where the phase information of the panchromatic pixel W32 is R32 and the phase information of the panchromatic pixel W41 is L41, and then the processor 20 calculates a phase difference according to the phase information R32 of the panchromatic pixel W32 and the phase information L41 of the panchromatic pixel W41, to perform focusing. For the sub-unit U4 covered by the lens 170, the processor 20 obtains phase information of the panchromatic pixel W34 and the panchromatic pixel W43 arranged in the first diagonal direction, where the phase information of the color pixel W34 is R34 and the phase information of the panchromatic pixel W43 is L43, and then the processor 20 calculates a phase difference according to the phase information R34 of the panchromatic pixel W34 and the phase information L43 of the panchromatic pixel W43, to perform focusing.

In the embodiments of the present disclosure, the processor 20 calculates the phase difference according to the phase information of the panchromatic pixels arranged in the first diagonal direction, to perform focusing. The control method and the camera assembly 40 according to the embodiments of the present disclosure is more suitable for application in the above scenario where the ambient brightness is smaller than the second predetermined brightness.

Further, when the processor 20 obtains phase information of the panchromatic pixels arranged in the first diagonal direction of each of the sub-units 102, the processor 20 may form a first panchromatic phase curve according to first phase information of the phase information of the panchromatic pixels arranged in the first diagonal direction of each of the sub-units 102, and form a second panchromatic phase curve according to second phase information of the phase information of the panchromatic pixels arranged in the first diagonal direction of each of the sub-units 102, and then calculate phase difference according to the first panchromatic phase curve and the second panchromatic phase curve, to perform focusing. Specifically, the first phase information may be the aforementioned "L" phase information and the second phase information may be the aforementioned "R" phase information. For example, the processor 20 forms the first panchromatic phase curve according to the phase information L21, L23, L41, and L43, and forms the second panchromatic phase curve according to the phase information R12, R14, R32, and R34, and then calculates the phase difference according to positions of peaks of the first panchromatic phase curve and the second panchromatic phase curve, to perform focusing.

Referring to FIGS. 13 and 17, in some embodiments, the obtaining phase information of different pixels 101 of the corresponding one sub-unit 102 covered by the lens 170 (i.e., block 01) may include: block 013, obtaining the phase information of multiple pixel pairs arranged in a lengthwise direction of the two-dimensional pixel array 11 in the corresponding one sub-unit 102 covered by the lens 170, each of the multiple pixel pairs including at least one color pixel and at least one panchromatic pixel arranged in a widthwise direction of the two-dimensional pixel array 11 in the corresponding one sub-unit 102 covered by the lens 170; and the calculating a phase difference according to the phase information of the different pixels 101, to perform focusing (i.e., the block 02) may include: block 023, calculating the phase difference according to the phase information of the pixel pairs arranged in the lengthwise direction of the two-dimensional pixel array 11, to perform focusing.

Referring to FIG. 13, in some embodiments, blocks 013 and 023 may be implemented by the processor 20. That is, processor 20 may be configured to: obtain the phase information of multiple pixel pairs arranged in a lengthwise direction of the two-dimensional pixel array 11 in the corresponding one sub-unit 102 covered by the lens 170, where each of the multiple pixel pairs including at least one color pixel and at least one panchromatic pixel arranged in a widthwise direction of the two-dimensional pixel array 11 in the corresponding one sub-unit 102 covered by the lens 170; and calculate the phase difference according to the phase information of the pixel pairs arranged in the lengthwise direction of the two-dimensional pixel array 11, to perform focusing.

Figure 18:
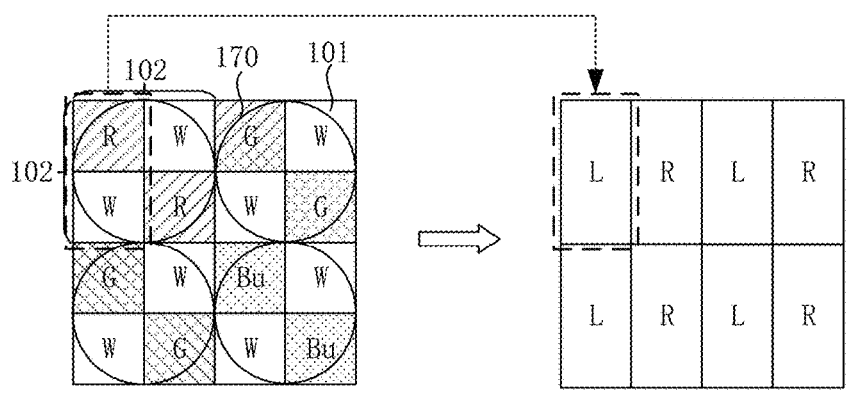
FIG. 18 illustrates a schematic principle view of a control method according to some embodiments of the present disclosure.

Specifically, taking FIG. 18 as an example, the minimum repeating unit includes four sub-units 102, from left to right and from top to bottom, a sub-unit U1, a sub-unit U2, a sub-unit U3, and a sub-unit U4. The minimum repeating unit includes 16 pixels 101, from left to right and from top to bottom: a color pixel R11, a panchromatic pixel W12, a color pixel G13, a panchromatic pixel W14, a panchromatic pixel W21, a color pixel R22, a panchromatic pixel W23, a color pixel G24, a color pixel G31, a panchromatic pixel W32, a color pixel B33, a panchromatic pixel W34, a panchromatic pixel W41, a color pixel G42, a panchromatic pixel W43, and a color pixel B44. That is to say, the sub-unit U1 includes the color pixel R11, the panchromatic pixel W12, the panchromatic pixel W21, and the color pixel R22; the sub-unit U2 includes the color pixel G13, the panchromatic pixel W14, the panchromatic pixel W23, and the color pixel G24; the sub-unit U3 includes the color pixel G31, the panchromatic pixel W32, the panchromatic pixel W41, the color pixel G42, and sub-unit U4 includes the color pixel B33, the panchromatic pixel W34, the panchromatic pixel W43, and the color pixel B44.

For the sub-unit U1 covered by the lens 170, the color pixel R11 and the panchromatic pixel W21 arranged in a widthwise direction of the two-dimensional pixel array 11 form a pixel pair, the panchromatic pixel W12 and the color pixel R22 arranged in the widthwise direction of the two-dimensional pixel array 11 form a pixel pair, the pixel pair formed by the color pixel R11 and the panchromatic pixel W21 and the pixel pair formed by the panchromatic pixel W12 and the color pixel R22 are arranged in a lengthwise direction of the two-dimensional pixel array 11, the processor 20 obtains phase information L11 of the pixel pair formed by the color pixel R11 and the panchromatic pixel W21, and phase information R12 of the pixel pair formed by the panchromatic pixel W12 and the color pixel R22, and then calculates a phase difference according to the phase information L11 of the pixel pair formed by the color pixel R11 and the panchromatic pixel W21, and the phase information R12 of the pixel pair formed by the panchromatic pixel W12 and the color pixel R22, to perform focusing.

For the sub-unit U2 covered by the lens 170, the color pixel G13 and the panchromatic pixel W23 arranged in the widthwise direction of the two-dimensional pixel array 11 form a pixel pair, the panchromatic pixel W14 and the color pixel G24 arranged in the widthwise direction of the two-dimensional pixel array 11 form a pixel pair, the pixel pair formed by the color pixel G13 and the panchromatic pixel W23 and the pixel pair formed by the panchromatic pixel W14 and the color pixel G24 are arranged in the lengthwise direction of the two-dimensional pixel array 11, the processor 20 obtains phase information L13 of the pixel pair formed by the color pixel G13 and the panchromatic pixel W23, and phase information R14 of the pixel pair formed by the panchromatic pixel W14 and the color pixel G24, and then calculates a phase difference according to the phase information L13 of the pixel pair formed by the color pixel G13 and the panchromatic pixel W23, and the phase information R14 of the pixel pair formed by the panchromatic pixel W14 and the color pixel G24, to perform focusing.

For the sub-unit U3 covered by the lens 170, the color pixel G31 and the panchromatic pixel W41 arranged in the widthwise direction of the two-dimensional pixel array 11 form a pixel pair, the panchromatic pixel W32 and the color pixel G42 arranged in the widthwise direction of the two-dimensional pixel array 11 form a pixel pair, the pixel pair formed by the color pixel G31 and the panchromatic pixel W41 and the pixel pair formed by the panchromatic pixel W32 and the color pixel G42 are arranged in the lengthwise direction of the two-dimensional pixel array 11, the processor 20 obtains phase information L21 of the pixel pair formed by the color pixel G31 and the panchromatic pixel W41, and phase information R22 of the pixel pair formed by the panchromatic pixel W32 and the color pixel G42, and then calculates a phase difference according to the phase information L21 of the pixel pair formed by the color pixel G31 and the panchromatic pixel W41, and the phase information R22 of the pixel pair formed by the panchromatic pixel W32 and the color pixel G42, to perform focusing.

For the sub-unit U4 covered by the lens 170, the color pixel B33 and the panchromatic pixel W43 arranged in the widthwise direction of the two-dimensional pixel array 11 form a pixel pair, the panchromatic pixel W34 and the color pixel B44 arranged in the widthwise direction of the two-dimensional pixel array 11 form a pixel pair, the pixel pair formed by the color pixel B33 and the panchromatic pixel W43 and the pixel pair formed by the panchromatic pixel W34 and the color pixel B44 are arranged in the lengthwise direction of the two-dimensional pixel array 11, the processor 20 obtains phase information L23 of the pixel pair formed by the color pixel B33 and the panchromatic pixel W43, and phase information R24 of the pixel pair formed by the panchromatic pixel W34 and the color pixel B44, and then calculates a phase difference according to the phase information L23 of the pixel pair formed by the color pixel B33 and the panchromatic pixel W43, and the phase information R24 of the pixel pair formed by the panchromatic pixel W34 and the color pixel B44, to perform focusing.

In the embodiments of the present disclosure, the processor 20 calculates the phase difference according to the phase information of the pixel pairs arranged in the lengthwise direction of the two-dimensional pixel array 11, to perform focusing. Since each pixel pair includes a panchromatic pixel, with the embodiments of the present disclosure, an amount of signal for phase detection auto focus is increased and a focusing performance in dark light is improved. The control method and the camera assembly 40 according to the embodiments of the present disclosure are more suitable for application in the above scenario where the ambient brightness is less than the first predetermined brightness.

In addition, with respect to the control method and the camera assembly 40 according to the present embodiments of the present disclosure, the image sensor 10 that can acquire phase information in a horizontal direction is adopted, thereby allowing the control method and the camera assembly 40 according to the embodiments of the present disclosure to be applied in a scene containing a large number of pure color horizontal stripes, improving a scenario adaptability and an accuracy of the phase detection auto focus of the control method and the camera assembly 40 according to the embodiments of the present disclosure.

When the processor 20 obtains phase information of pixel pairs arranged in the lengthwise direction of the two-dimensional pixel array 11 of each of the sub-units 102, the processor 20 may form a first longitudinal merged phase curve according to first phase information of the phase information of pixel pairs arranged in the lengthwise direction of the two-dimensional pixel array 11 of each of the sub-units 102, and form a second longitudinal merged phase curve according to second phase information of the phase information of pixel pairs arranged in the lengthwise direction of the two-dimensional pixel array 11 of each of the sub-units 102, and then calculate phase difference according to the first longitudinal merged phase curve and the second longitudinal merged phase curve, to perform focusing. Specifically, the first phase information may be the aforementioned "L" phase information and the second phase information may be the aforementioned "R" phase information. For example, the processor 20 forms the first longitudinal merged phase curve according to the phase information L11, L13, L21, and L23, and forms the second longitudinal merged phase curve according to R12, R14, R22, R24, and then calculates the phase difference according to positions of peaks of the first longitudinal merged phase curve and the second longitudinal merged phase curve, to perform focusing.

Referring to FIGS. 13 and 19, in some embodiments, the obtaining phase information of different pixels 101 of the corresponding one sub-unit 102 covered by the lens 170 (i.e., block 01) may include: block 014, obtaining the phase information of pixel pairs arranged in a widthwise direction of the two-dimensional pixel array 11 in the corresponding one sub-unit 102 covered by the lens 170, each of the multiple pixel pairs including at least one color pixels and at least two panchromatic pixels arranged in a lengthwise direction of the two-dimensional pixel array 11 in the corresponding one sub-unit 102 covered by the lens 170; and the calculating a phase difference according to the phase information of the different pixels 101, to perform focusing (i.e., the block 02) may include: block 024, calculating the phase difference according to the phase information of the pixel pairs arranged in the widthwise direction of the two-dimensional pixel array 11, to perform focusing.

Referring to FIG. 13, in some embodiments, blocks 014 and 024 may be implemented by the processor 20. That is, processor 20 may be configured to: obtain the phase information of pixel pairs arranged in a widthwise direction of the two-dimensional pixel array 11 in the corresponding one sub-unit 102 covered by the lens 170, each of the multiple pixel pairs including at least one color pixels and at least two panchromatic pixels arranged in a lengthwise direction of the two-dimensional pixel array 11 in the corresponding one sub-unit 102 covered by the lens 170; and calculate the phase difference according to the phase information of the pixel pairs arranged in the widthwise direction of the two-dimensional pixel array 11, to perform focusing.

Figure 20:
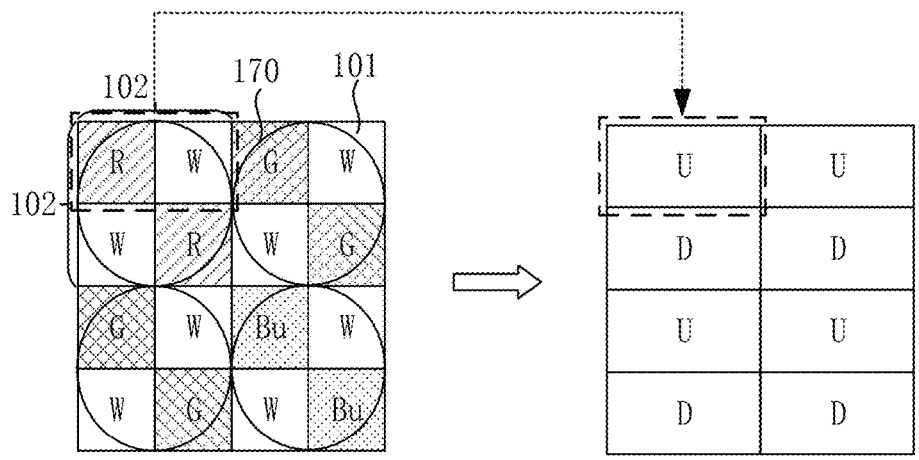
FIG. 20 illustrates a schematic principle view of a control method according to some embodiments of the present disclosure.

Specifically, taking FIG. 20 as an example, the minimum repeating unit includes four sub-units 102, from left to right and from top to bottom, a sub-unit U1, a sub-unit U2, a sub-unit U3, and a sub-unit U4. The minimum repeating unit includes 16 pixels 101, from left to right and from top to bottom: a color pixel R11, a panchromatic pixel W12, a color pixel G13, a panchromatic pixel W14, a panchromatic pixel W21, a color pixel R22, a panchromatic pixel W23, a color pixel G24, a color pixel G31, a panchromatic pixel W32, a color pixel B33, a panchromatic pixel W34, a panchromatic pixel W41, a color pixel G42, a panchromatic pixel W43, and a color pixel B44. That is to say, the sub-unit U1 includes the color pixel R11, the panchromatic pixel W12, the panchromatic pixel W21, and the color pixel R22; the sub-unit U2 includes the color pixel G13, the panchromatic pixel W14, the panchromatic pixel W23, and the color pixel G24; the sub-unit U3 includes the color pixel G31, the panchromatic pixel W32, the panchromatic pixel W41, the color pixel G42, and sub-unit U4 includes the color pixel B33, the panchromatic pixel W34, the panchromatic pixel W43, and the color pixel B44.

For the sub-unit U1 covered by the lens 170, the color pixel R11 and the panchromatic pixel W12 arranged in a lengthwise direction of the two-dimensional pixel array 11 form a pixel pair, the panchromatic pixel W21 and the color pixel R22 arranged in the lengthwise direction of the two-dimensional pixel array 11 form a pixel pair, the pixel pair formed by the color pixel R11 and the panchromatic pixel W12 and the pixel pair formed by the panchromatic pixel W21 and the color pixel R22 are arranged in a widthwise direction of the two-dimensional pixel array 11, the processor 20 obtains phase information U11 of the pixel pair formed by the color pixel R11 and the panchromatic pixel W12, and phase information D21 of the pixel pair formed by the panchromatic pixel W21 and the color pixel R22, and then calculates a phase difference according to the phase information U11 of the pixel pair formed by the color pixel R11 and the panchromatic pixel W12, and the phase information D21 of the pixel pair formed by the panchromatic pixel W21 and the color pixel R22, to perform focusing.

For the sub-unit U2 covered by the lens 170, the color pixel G13 and the panchromatic pixel W14 arranged in the lengthwise direction of the two-dimensional pixel array 11 form a pixel pair, the panchromatic pixel W23 and the color pixel G24 arranged in the lengthwise direction of the two-dimensional pixel array 11 form a pixel pair, the pixel pair formed by the color pixel G13 and the panchromatic pixel W14 and the pixel pair formed by the panchromatic pixel W23 and the color pixel G24 are arranged in the widthwise direction of the two-dimensional pixel array 11, the processor 20 obtains phase information U12 of the pixel pair formed by the color pixel G13 and the panchromatic pixel W14, and phase information D22 of the pixel pair formed by the panchromatic pixel W23 and the color pixel G24, and then calculates a phase difference according to the phase information U12 of the pixel pair formed by the color pixel G13 and the panchromatic pixel W14, and the phase information D22 of the pixel pair formed by the panchromatic pixel W23 and the color pixel G24, to perform focusing.

For the sub-unit U3 covered by the lens 170, the color pixel G31 and the panchromatic pixel W32 arranged in the lengthwise direction of the two-dimensional pixel array 11 form a pixel pair, the panchromatic pixel W41 and the color pixel G42 arranged in the lengthwise direction of the two-dimensional pixel array 11 form a pixel pair, the pixel pair formed by the color pixel G31 and the panchromatic pixel W32 and the pixel pair formed by the panchromatic pixel W41 and the color pixel G42 are arranged in the widthwise direction of the two-dimensional pixel array 11, the processor 20 obtains phase information U31 of the pixel pair formed by the color pixel G31 and the panchromatic pixel W32, and phase information D41 of the pixel pair formed by the panchromatic pixel W41 and the color pixel G42, and then calculates a phase difference according to the phase information U31 of the pixel pair formed by the color pixel G31 and the panchromatic pixel W32, and the phase information D41 of the pixel pair formed by the panchromatic pixel W41 and the color pixel G42, to perform focusing.

For the sub-unit U4 covered by the lens 170, the color pixel B33 and the panchromatic pixel W34 arranged in the lengthwise direction of the two-dimensional pixel array 11 form a pixel pair, the panchromatic pixel W42 and the color pixel B44 arranged in the lengthwise direction of the two-dimensional pixel array 11 form a pixel pair, the pixel pair formed by the color pixel B33 and the panchromatic pixel W34 and the pixel pair formed by the panchromatic pixel W43 and the color pixel B44 are arranged in the lengthwise direction of the two-dimensional pixel array 11, the processor 20 obtains phase information U32 of the pixel pair formed by the color pixel B33 and the panchromatic W34, and phase information D42 of the pixel pair formed by the panchromatic pixel W43 and the color pixel B44, and then calculates a phase difference according to the phase information U32 of the pixel pair formed by the color pixel B33 and the panchromatic pixel W34, and the phase information D42 of the pixel pair formed by the panchromatic pixel W43 and the color pixel B44, to perform focusing.

In the embodiments of the present disclosure, the processor 20 calculates the phase difference according to the phase information of the pixel pairs arranged in the widthwise direction of the two-dimensional pixel array 11, to perform focusing. Since each pixel pair includes a panchromatic pixel, with the embodiments of the present disclosure, an amount of signal for phase detection auto focus is increased and a focusing performance in dark light is improved. The control method and the camera assembly 40 according to the embodiments of the present disclosure are more suitable for application in the above scenario where the ambient brightness is less than the first predetermined brightness.

In addition, with respect to the control method and the camera assembly 40 according to the present embodiments of the present disclosure, the image sensor 10 that can acquire phase information in a vertical direction is adopted, thereby allowing the control method and the camera assembly 40 according to the embodiments of the present disclosure to be applied in a scene containing a large number of pure color vertical stripes, improving a scenario adaptability and an accuracy of the phase detection auto focus of the control method and the camera assembly 40 according to the embodiments of the present disclosure.

When the processor 20 obtains phase information of pixel pairs arranged in the widthwise direction of the two-dimensional pixel array 11 of each of the sub-units 102, the processor 20 may form a first horizontal merged phase curve according to first phase information of the phase information of pixel pairs arranged in the widthwise direction of the two-dimensional pixel array 11 of each of the sub-units 102, and form a second horizontal merged phase curve according to second phase information of the phase information of pixel pairs arranged in the widthwise direction of the two-dimensional pixel array 11 of each of the sub-units 102, and then calculate phase difference according to the first horizontal merged phase curve and the second horizontal merged phase curve, to perform focusing. Specifically, the first phase information may be the aforementioned "U" phase information and the second phase information may be the aforementioned "D" phase information. For example, the processor 20 forms the first horizontal merged phase curve according to the phase information U11, U12, U31, and U32, and forms the second horizontal merged phase curve according to the phase information D21, D22, D41, and D42, and then calculates the phase difference according to positions of peaks of the first horizontal merged phase curve and the second horizontal merged phase curve, to perform focusing.

Referring to FIGS. 13 and 21, in some embodiments, the obtaining phase information of different pixels 101 of the corresponding one sub-unit 102 covered by the lens 170 (i.e., block 01) may include: block 015, obtaining one or more of the phase information of the at least two color pixels arranged in the second diagonal direction of the corresponding one sub-unit covered by the lens, the phase information of the at least two panchromatic pixels arranged in the first diagonal direction of the corresponding one sub-unit covered by the lens, the phase information of pixel pairs arranged in a lengthwise direction of the two-dimensional pixel array 11 in the corresponding one sub-unit covered by the lens, and the phase information of pixel pairs arranged in a widthwise direction of the two-dimensional pixel array 11 in the corresponding one sub-unit 102 covered by the lens 170; and the calculating a phase difference according to the phase information of the different pixels 101, to perform focusing (i.e., the block 02) may include: block 025, calculating the phase difference according to the one or more of the phase information of the at least two color pixels arranged in the second diagonal direction, the phase information of the at least two panchromatic pixels arranged in the first diagonal direction, the phase information of the pixel pairs arranged in the lengthwise direction of the two-dimensional pixel array 11, and the phase information of the pixel pairs arranged in the widthwise direction of the two-dimensional pixel array 11, to perform focusing.

Referring to FIG. 13, in some embodiments, blocks 015 and 025 may be implemented by the processor 20. That is, the processor 20 may be configured to: obtain one or more of the phase information of the at least two color pixels arranged in the second diagonal direction of the corresponding one sub-unit covered by the lens, the phase information of the at least two panchromatic pixels arranged in the first diagonal of the corresponding one sub-unit covered by the lens, the phase information of pixel pairs arranged in a lengthwise direction of the two-dimensional pixel array 11 in the corresponding one sub-unit covered by the lens, and the phase information of pixel pairs arranged in a widthwise direction of the two-dimensional pixel array 11 in the corresponding one sub-unit 102 covered by the lens 170; and calculate the phase difference according to the one or more of the phase information of the at least two color pixels arranged in the second diagonal direction, the phase information of the at least two panchromatic pixels arranged in the first diagonal direction, the phase information of the pixel pairs arranged in the lengthwise direction of the two-dimensional pixel array 11, and the phase information of the pixel pairs arranged in the widthwise direction of the two-dimensional pixel array 11, to perform focusing.

Specifically, the detail of the operation of the processor 20 to obtain one or more of the phase information of the at least two color pixels arranged in the second diagonal direction of the corresponding one sub-unit covered by the lens, the phase information of the at least two panchromatic pixels arranged in the first diagonal direction of the corresponding one sub-unit covered by the lens, the phase information of pixel pairs arranged in a lengthwise direction of the two-dimensional pixel array 11 in the corresponding one sub-unit covered by the lens, and the phase information of pixel pairs arranged in a widthwise direction of the two-dimensional pixel array 11 in the corresponding one sub-unit 102 covered by the lens 170; and calculate the phase difference according to the one or more of the phase information of the at least two color pixels arranged in the second diagonal direction, the phase information of the at least two panchromatic pixels arranged in the first diagonal direction, the phase information of the pixel pairs arranged in the lengthwise direction of the two-dimensional pixel array 11, and the phase information of the pixel pairs arranged in the widthwise direction of the two-dimensional pixel array 11, to perform focusing can refer to the explanatory corresponding to the previous embodiments.

In this embodiment, when the processor 20 obtains one or more of the phase information of the at least two color pixels arranged in the second diagonal direction of the corresponding one sub-unit covered by the lens, the phase information of the at least two panchromatic pixels arranged in the first diagonal direction of the corresponding one sub-unit covered by the lens, the phase information of pixel pairs arranged in a lengthwise direction of the two-dimensional pixel array 11 in the corresponding one sub-unit covered by the lens, and the phase information of pixel pairs arranged in a widthwise direction of the two-dimensional pixel array 11 in the corresponding one sub-unit 102 covered by the lens 170; and calculates the phase difference according to the one or more of the phase information of the at least two color pixels arranged in the second diagonal direction, the phase information of the at least two panchromatic pixels arranged in the first diagonal direction, the phase information of the pixel pairs arranged in the lengthwise direction of the two-dimensional pixel array 11, and the phase information of the pixel pairs arranged in the widthwise direction of the two-dimensional pixel array 11, to perform focusing, the processor 20 can use different manners to obtain phase information for the different sub-units 102 covered by the lens 170.

For example, combined with FIG. 14, FIG. 18 and FIG. 20, for the sub-unit U1 covered by the lens 170, the processor 20 obtains the phase information of the color pixels arranged in the second diagonal direction of the sub-unit U1; for the sub-unit U2 covered by the lens 170, the processor 20 obtains the phase information of the panchromatic pixels arranged in the first diagonal direction of the sub-unit U2; for the sub-unit U3 covered by the lens 170, the processor 20 obtains the phase information of the pixel pairs in the lengthwise direction of the two-dimensional pixel array 11 of the sub-unit U3 arranged; for the sub-unit U4 covered by the lens 170, the processor 20 obtains the phase information of the pixel pairs arranged in the widthwise direction of the two-dimensional pixel array 11 of the sub-unit U4. Finally, the processor 20 may calculate the phase difference for focusing according to any one selected from the phase information corresponding to the multiple sub-units 102. Specifically, the processor 20 may select the phase information corresponding to one subunit 102 from the phase information corresponding to the sub-units 102 according to a predetermined condition. The predetermined condition may be, for example, the ambient brightness, or the like. Alternatively, the processor 20 may also form a first phase curve according to the first phase information of the phase information corresponding to the different sub-units 102, form a second phase curve according to the second phase information of the phase information corresponding to the different sub-units 102, and then calculate the phase difference according to the first phase curve and the second phase curve to perform focusing. The first phase information may be the aforementioned "L" and "U" phase information, and the second phase information may be the aforementioned "R" and "D". For example, in the above example, the processor 20 may form the first phase curve according to L11 in the upper right diagram of FIG. 14, L23 in the lower right diagram of FIG. 14, L21 in the right diagram of FIG. 18, and U32 in the right diagram of FIG. 20, and form the second phase curve according to R22 in the upper right diagram of FIG. 14, R14 in the lower right diagram of FIG. 14, R22 in the right diagram of FIG. 18, and D42 in the right diagram of FIG. 20. The phase difference for focusing is then calculated according to positions of peaks in the first phase curve and the second phase curve.

With respect to the control method and the camera assembly 40 according to the embodiments of the present disclosure, the image sensor 10 that is capable of obtaining both phase information in the horizontal direction and phase information in the vertical direction, thereby enabling the control method and the camera assembly 40 according to the embodiments of the present disclosure to be applied to scenarios containing both a large number of pure color horizontal stripes and a large number of pure color vertical stripes, improving a scenario adaptability and an accuracy of the phase detection auto focus of the control method and the camera assembly 40 according to the embodiments of the present disclosure.

Referring to FIG. 22, the mobile terminal 90 according to the embodiments of the present disclosure may include a housing 80 and the camera assembly 40 according to any one of the above embodiments. The camera assembly 40 is mounted on the housing 80. Specifically, the camera assembly 40 may be mounted on the front of the housing 80 as a front-facing camera assembly; or the camera assembly 40 may be mounted on the back of the housing 80 as a rear-facing camera assembly. The mobile terminal 90 may be a mobile phone, a tablet, a laptop, a smart wearable device (e.g., a smart watch, a smart bracelet, smart glasses, a smart headset, etc.), a head-up display device, a virtual reality device, etc., which is not limited herein.

With respect to the mobile terminal 90 according to the embodiments of the present disclosure, since the two-dimensional pixel array 11 includes the color pixels and the panchromatic pixels, a luminous flux is increased, a better signal-to-noise ratio is achieved, and a better focusing performance can be achieved in dark light, compared with conventional color sensors.

In the description of the specification, reference to terms "one embodiment", "some embodiments", "an exemplary embodiment", "an example", "a specific example" or "some examples" etc. means that a specific feature, structure, material, or characteristic described in connection with the embodiment or example is included in at least one embodiment or example of the present disclosure. In this specification, the exemplary expressions of the above-mentioned terms do not necessarily refer to the same embodiment or example. Moreover, the described specific features, structures, materials or characteristics can be combined in an appropriate manner in one or more embodiments or examples. In addition, those skilled in the art can combine different embodiments or examples and features of the different embodiments or examples described in the specification if no conflict is incurred.

Any process or method described in a flowchart or described in other ways herein can be understood as including one or more modules, segments or parts of codes of executable instructions for implementing specific logical functions or steps in the process, and the scope of the embodiments of the present disclosure includes additional implementations, in which involved functions may be executed in an order different from the depicted or discussed order, including in a substantially simultaneous manner or in a reverse order. These should be understood by those skilled in the art to which the embodiments of the present disclosure pertain.

Although the embodiments of the present disclosure have been shown and described above, it can be understood that the above embodiments are exemplary and should not be construed as limiting the present disclosure. A person of ordinary skill in the art can make changes, modifications, replacements and variations to the foregoing embodiments within the scope of the present disclosure.

What is claimed is:

1. A control method, implemented by an image sensor, the image sensor comprising a two-dimensional pixel array and a lens array, the two-dimensional pixel array comprising a plurality of color pixels and a plurality of panchromatic pixels, the plurality of color pixels having narrower spectral responses than the plurality of panchromatic pixels; the two-dimensional pixel array comprising minimum repeating units, in which the plurality of panchromatic pixels are arranged in a first diagonal direction and the plurality of color pixels are arranged in a second diagonal direction being different from the first diagonal direction; each of the minimum repeating units comprising a plurality of sub-units, and each of the plurality of sub-units comprising at least two color pixels of the plurality of color pixels and at least two panchromatic pixels of the plurality of panchromatic pixels; and the lens array comprising a plurality of lenses, and each of the plurality of lenses covering a corresponding one sub-unit of the plurality of sub-units, the control method comprising:

obtaining phase information of different pixels of the corresponding one sub-unit covered by the lens; and calculating a phase difference according to the phase information of the different pixels, to perform focusing;

wherein obtaining phase information of different pixels of the corresponding one sub-unit covered by the lens comprises:

obtaining the phase information of a plurality of pixel pairs arranged in a lengthwise direction of the two-dimensional pixel array in the corresponding one sub-unit covered by the lens, each of the plurality of pixel pairs comprising at least one color pixel and at least one panchromatic pixel arranged in a widthwise direction of the two-dimensional pixel array in the corresponding one sub-unit covered by the lens; and wherein calculating the phase difference according to the phase information of the different pixels, to perform focusing comprises:

calculating the phase difference according to the phase information of the plurality of pixel pairs arranged in the lengthwise direction of the two-dimensional pixel array, to perform focusing;

or wherein obtaining phase information of different pixels of the corresponding one sub-unit covered by the lens comprises:

obtaining the phase information of a plurality of pixel pairs arranged in a widthwise direction of the two-dimensional pixel array in the corresponding one sub-unit covered by the lens, each of the plurality of pixel pairs comprising at least one color pixel and at least one panchromatic pixel arranged in a lengthwise direction of the two-dimensional pixel array in the corresponding one sub-unit covered by the lens; and wherein calculating the phase difference according to the phase information of the different pixels, to perform focusing comprises:

calculating the phase difference according to the phase information of the plurality of pixel pairs arranged in the widthwise direction of the two-dimensional pixel array, to perform focusing.

2. The control method according to claim 1, further comprising:

in response to an ambient brightness being smaller than a first predetermined brightness, obtaining phase information of different panchromatic pixels of the corresponding one sub-unit covered by the lens, and calculating a phase difference according to the phase information of the different panchromatic pixels, to perform focusing;

in response to the ambient brightness being greater than a second predetermined brightness, obtaining phase information of different color pixels of the corresponding one sub-unit covered by the lens, and calculating a phase difference according to the phase information of the different color pixels, to perform focusing; and in response to the ambient brightness being greater than the first predetermined brightness and smaller than the second predetermined brightness, obtaining the phase information of the different panchromatic pixels of the corresponding one sub-unit covered by the lens and the phase information of the different color pixels of the corresponding one sub-unit covered by the lens, and calculating a phase difference according to at least one of the phase information of the different panchromatic pixels and the phase information of the different color pixels, to perform focusing.

3. A camera assembly, comprising an image sensor and a processor, the image sensor comprising a two-dimensional pixel array and a lens array, the two-dimensional pixel array comprising a plurality of color pixels and a plurality of panchromatic pixels, the plurality of color pixels having narrower spectral responses than the plurality of panchromatic pixels; the two-dimensional pixel array comprising minimum repeating units, in which the plurality of panchromatic pixels are arranged in a first diagonal direction and the plurality of color pixels are arranged in a second diagonal direction being different from the first diagonal direction; each of the minimum repeating units comprising a plurality of sub-units, and each of the plurality of sub-units comprising at least two color pixels of the plurality of color pixels and at least two panchromatic pixels of the plurality of panchromatic pixels; and the lens array comprising a plurality of lenses, and each of the plurality of lenses covering a corresponding one sub-unit of the plurality of sub-units, the processor being configured to:

obtain phase information of different pixels of the corresponding one sub-unit covered by the lens; and calculate a phase difference according to the phase information of the different pixels, to perform focusing;

wherein the processor is further configured to:

in response to an ambient brightness being smaller than a first predetermined brightness, obtain phase information of different panchromatic pixels of the corresponding one sub-unit covered by the lens and calculate a phase difference according to the phase information of the different panchromatic pixels, to perform focusing:

in response to the ambient brightness being greater than a second predetermined brightness, obtain phase information of different color pixels of the corresponding one sub-unit covered by the lens, and calculate a phase difference according to the phase information of the different color pixels, to perform focusing; and in response to the ambient brightness being greater than the first predetermined brightness and smaller than the second predetermined brightness, obtain the phase information of the different panchromatic pixels of the corresponding one sub-unit covered by the lens and the phase information of the different color pixels of the corresponding one sub-unit covered by the lens, and calculate a phase difference according to at least one of the phase information of the different panchromatic pixels and the phase information of the different color pixels to perform focusing.

4. The camera assembly according to claim 3, wherein the processor is further configured to:

obtain the phase information of the at least two color pixels arranged in the second diagonal direction of the corresponding one sub-unit covered by the lens; and calculate the phase difference according to the phase information of the at least two color pixels arranged in the second diagonal direction, to perform focusing.

5. The camera assembly according to claim 3, wherein the processor is further configured to:

obtain the phase information of the at least two panchromatic pixels arranged in the first diagonal direction of the corresponding one sub-unit covered by the lens; and calculate the phase difference according to the phase information of the at least two panchromatic pixels arranged in the first diagonal direction, to perform focusing.

6. The camera assembly according to claim 3, wherein the processor is further configured to:

obtain the phase information of a plurality of pixel pairs arranged in a lengthwise direction of the two-dimensional pixel array in the corresponding one sub-unit covered by the lens, each of the plurality of pixel pairs comprising at least one color pixel and at least one panchromatic pixel arranged in a widthwise direction of the two-dimensional pixel array in the corresponding one sub-unit covered by the lens; and calculate the phase difference according to the phase information of the plurality of pixel pairs arranged in the lengthwise direction of the two-dimensional pixel array, to perform focusing.

7. The camera assembly according to claim 3, wherein the processor is further configured to:

obtain the phase information of a plurality of pixel pairs arranged in a widthwise direction of the two-dimensional pixel array in the corresponding one sub-unit covered by the lens, each of the plurality of pixel pairs comprising at least one color pixel and at least one panchromatic pixel arranged in a lengthwise direction of the two-dimensional pixel array in the corresponding one sub-unit covered by the lens; and calculate the phase difference according to the phase information of the plurality of pixel pairs arranged in the widthwise direction of the two-dimensional pixel array, to perform focusing.

8. The camera assembly according to claim 3, wherein the processor is configured to:

obtain one or more of the phase information of the at least two color pixels arranged in the second diagonal direction of the corresponding one sub-unit covered by the lens, the phase information of the at least two panchromatic pixels arranged in first diagonal direction of the corresponding one sub-unit covered by the lens, the phase information of a plurality of pixel pairs arranged in a lengthwise direction of the two-dimensional pixel array in the corresponding one sub-unit covered by the lens, and the phase information of a plurality of pixel pairs arranged in a widthwise direction of the two-dimensional pixel array in the corresponding one sub-unit covered by the lens; and calculate the phase difference according to the one or more of the phase information of the at least two color pixels arranged in the second diagonal direction, the phase information of the at least two panchromatic pixels arranged in the first diagonal direction, the phase information of the plurality of pixel pairs arranged in the lengthwise direction of the two-dimensional pixel array, and the phase information of the plurality of pixel pairs arranged in the widthwise direction of the two-dimensional pixel array, to perform focusing.

9. The camera assembly according to claim 3, wherein the processor is further configured to:

obtain the phase information of the at least two color pixels arranged in the second diagonal direction of the corresponding one sub-unit covered by the lens;

form a first color phase curve according to first phase information of the phase information of the at least two color pixels arranged in the second diagonal direction of the corresponding one sub-unit covered by the lens;

form a second color phase curve according to first phase information of the phase information of the at least two color pixels arranged in the second diagonal direction of the corresponding one sub-unit covered by the lens; and calculate the phase difference according to positions of peaks of the first color phase curve and the second color phase curve.

10. A mobile terminal, comprising:

a housing; and a camera assembly mounted on the housing and comprising an image sensor and a processor, the image sensor comprising a two-dimensional pixel array and a lens array, the two-dimensional pixel array comprising a plurality of color pixels and a plurality of panchromatic pixels, the plurality of color pixels having narrower spectral responses than the plurality of panchromatic pixels; the two-dimensional pixel array comprising minimum repeating units, in which the plurality of panchromatic pixels are arranged in a first diagonal direction and the plurality of color pixels are arranged in a second diagonal direction being different from the first diagonal direction; each of the minimum repeating units comprising a plurality of sub-units, and each of the plurality of sub-units comprising at least two color pixels of the plurality of color pixels and at least two panchromatic pixels of the plurality of panchromatic pixels; and the lens array comprising a plurality of lenses, and each of the plurality of lenses covering a corresponding one sub-unit of the plurality of sub-units, the processor being configured to:

obtain phase information of different pixels of the corresponding one sub-unit covered by the lens; and calculate a phase difference according to the phase information of the different pixels, to perform focusing;

wherein the processor is further configured to:

obtain the phase information of the at least two color pixels arranged in the second diagonal direction of the corresponding one sub-unit covered by the lens;

form a first color phase curve according to first phase information of the phase information of the at least two color pixels arranged in the second diagonal direction of the corresponding one sub-unit covered by the lens;

form a second color phase curve according to first phase information of the phase information of the at least two color pixels arranged in the second diagonal direction of the corresponding one sub-unit covered by the lens; and calculate the phase difference according to positions of peaks of the first color phase curve and the second color phase curve.

11. The mobile terminal according to claim 10, wherein the processor is configured to:

in response to an ambient brightness being smaller than a first predetermined brightness, obtain phase information of different panchromatic pixels of the corresponding one sub-unit covered by the lens and calculate a phase difference according to the phase information of the different panchromatic pixels, to perform focusing;

in response to the ambient brightness being greater than a second predetermined brightness, obtain phase information of different color pixels of the corresponding one sub-unit covered by the lens, and calculate a phase difference according to the phase information of the different color pixels, to perform focusing; and in response to the ambient brightness being greater than the first predetermined brightness and smaller than the second predetermined brightness, obtain the phase information of the different panchromatic pixels of the corresponding one sub-unit covered by the lens and phase information of the different color pixels of the corresponding one sub-unit covered by the lens, and calculate a phase difference according to at least one of the phase information of the different panchromatic pixels and the phase information of the different color pixels, to perform focusing.

\* \* \* \* \*